United States Patent
Kinoshita

(10) Patent No.: US 6,452,719 B2
(45) Date of Patent: Sep. 17, 2002

(54) OPTICAL COMMUNICATION SYSTEM AND OPTICAL AMPLIFIER

(75) Inventor: Susumu Kinoshita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/897,108

(22) Filed: Jul. 3, 2001

Related U.S. Application Data

(62) Division of application No. 09/572,854, filed on May 18, 2000, now Pat. No. 6,282,017, which is a division of application No. 09/222,323, filed on Dec. 29, 1998, now Pat. No. 6,108,123, which is a division of application No. 08/763,102, filed on Dec. 10, 1996, now Pat. No. 6,023,366.

(30) Foreign Application Priority Data

May 31, 1996 (JP) ............................................. 8-138243

(51) Int. Cl.$^7$ ............................. G02F 1/35; H01S 3/133
(52) U.S. Cl. .............................. 359/337.12; 359/337.5; 359/341.41; 359/341.42; 359/161; 359/174
(58) Field of Search ................................ 359/133, 134, 359/161, 174, 177, 341.41, 341.42, 337.12, 337.5

(56) References Cited

U.S. PATENT DOCUMENTS

| | | | |
|---|---|---|---|
| 4,954,786 A | * 9/1990 | Yamakawa et al. | 372/31 |
| 5,225,922 A | 7/1993 | Chraplyvy et al. | |
| 5,282,074 A | * 1/1994 | Miyazaki et al. | 359/174 |
| 5,396,360 A | 3/1995 | Majima | |
| 5,497,264 A | 3/1996 | Bayart et al. | |
| 5,539,563 A | * 7/1996 | Park | 359/161 |
| 5,664,131 A | * 9/1997 | Sugiya | 359/341 |
| 5,699,081 A | 12/1997 | Denkin et al. | |
| 5,703,711 A | * 12/1997 | Hamada | 359/341 |
| 5,805,322 A | 9/1998 | Tomofuji | |
| 6,094,296 A | * 7/2000 | Kinoshita | 359/341 |
| 6,282,017 B1 | * 8/2001 | Kinoshita | 359/341.42 |

FOREIGN PATENT DOCUMENTS

| | | | |
|---|---|---|---|
| EP | 0467396 A2 | | 1/1992 |
| EP | 0 637148 A1 | | 2/1995 |
| EP | 637148 | * | 2/1995 |
| EP | 0777346 A2 | | 6/1997 |
| EP | 0782289 A1 | | 7/1997 |
| EP | 0 782 289 | | 7/1997 |
| EP | 0817415 A2 | | 1/1998 |
| EP | 0 817 415 | | 1/1998 |
| EP | 0844756 A2 | | 5/1998 |
| GB | 2257320 A | | 1/1993 |
| GB | 2268017 | * | 12/1993 |
| GB | 2297212 A | | 7/1996 |
| GB | 2 297 212 | | 7/1996 |
| JP | 6152634 | | 5/1994 |
| JP | 7-301831 | | 5/1994 |
| JP | 08-090597 A | | 4/1996 |
| JP | 10022979 | | 1/1998 |

OTHER PUBLICATIONS

Miyata et al, Tech. Report of IEICE, OCS95–34, 7/95; pp 7–10, "Dispersion Compensation Design . . . ".*

(List continued on next page.)

Primary Examiner—Nelson Moskowitz
(74) Attorney, Agent, or Firm—Staas & Halsey LLP

(57) ABSTRACT

An optical communication system having a transmitting station for outputting WDM (wavelength-division multiplexing) signal light, an optical fiber transmission line, a receiving station, and an optical repeater including an optical amplifier. The transmitting station includes a supervisory circuit for detecting the number of channels of the WDM signal light and transmitting supervisory information including the number of channels to the optical repeater. The optical repeater further includes a circuit for controlling the optical amplifier so that the output level of the optical amplifier becomes a target level. The target level is set according to the supervisory information. According to the structure, it can be possible to provide a system which can easily respond to a change in the number of WDM channels.

3 Claims, 23 Drawing Sheets

OTHER PUBLICATIONS

Go et al, Electronic Manufacturing Tech. Symp., 1995, 18th IECE ICPart International, pp 264–267.*

Patent Abstracts of Japan, vol. 018, No. 318 (E–1562), Jun. 16, 1994 & JP 06 069890 A (Nippon Telegraph & Teleph. Corp.), Mar. 11, 1994, Abstract.

Bayart et al. "1.55μm Fluoride–Based EDFA with Gain–Flatness Control For Multiwavelength Applications" Electronics Letters, vol. 30, No. 17, Aug. 18, 1994, pp. 1407–1409.

Masuda et al. "Gain Monitoring of Erbium–Doped Fiber Amplifiers By Detecting Spontaneous Emission" IEEE Photonics Technology Letters, vol. 5, No. 9, Sep. 1, 1993, pp. 1017–1019.

English language European Search Report for European application EP 96119965.

JP Patent Abstract No. 4–229837, (Aug. 19, 1992).
JP Patent Abstract No. 5–37472, (Feb. 12, 1993).
JP Patent Abstract No. 5–160473, (Jun. 25, 1993).
JP Patent Abstract No. 5–35902, (Sep. 10, 1993).

* cited by examiner

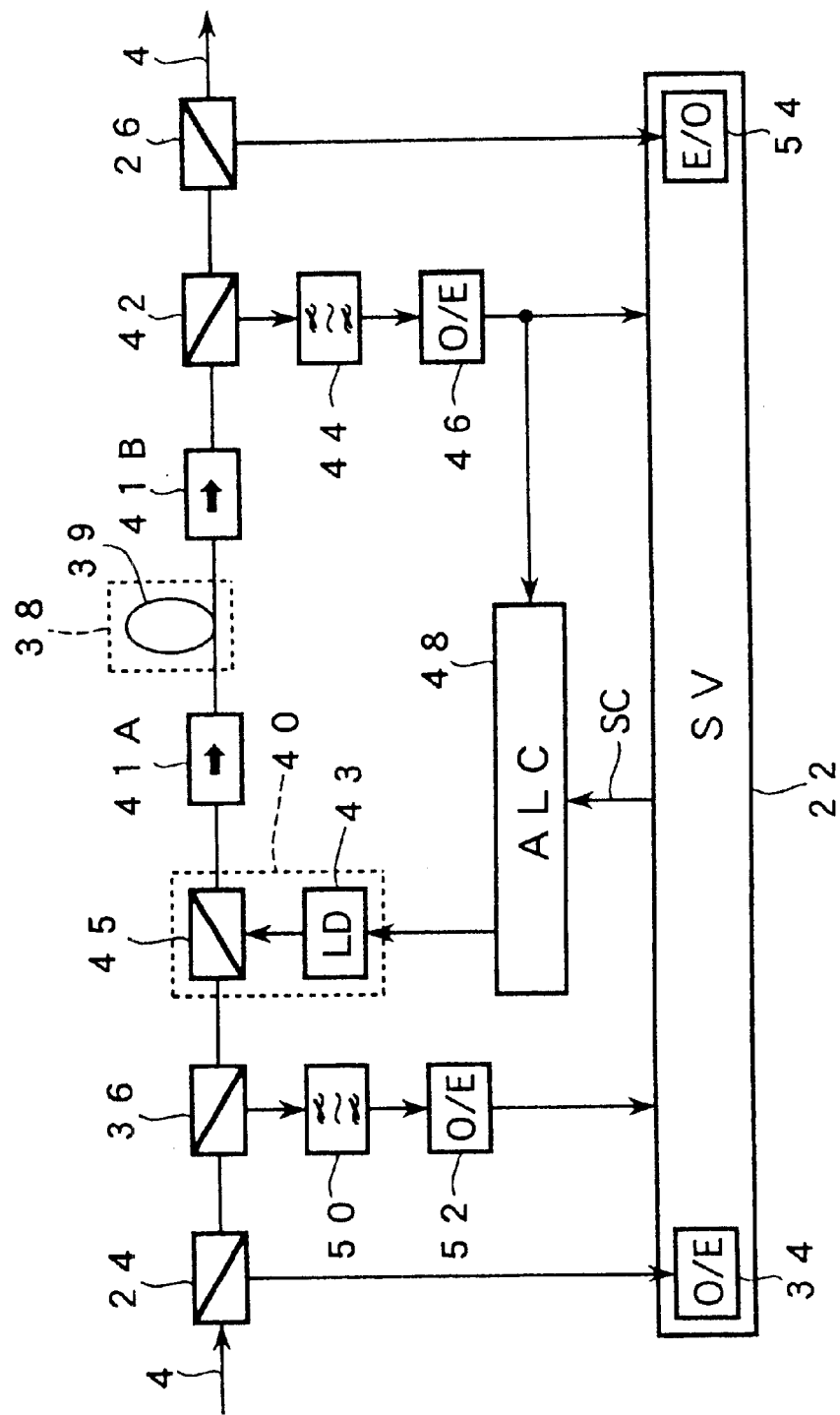

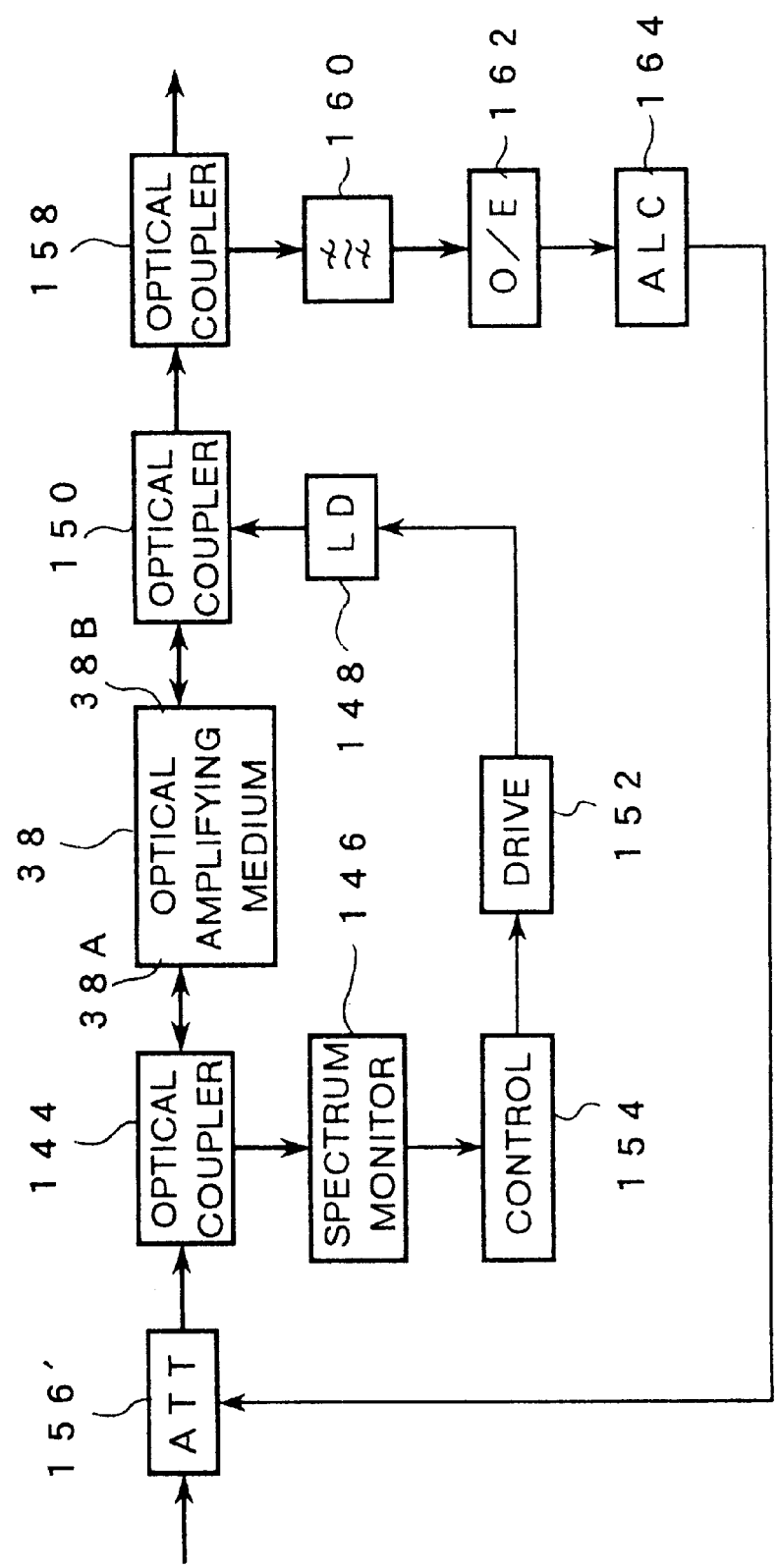

OPTICAL COMMUNICATION SYSTEM AND OPTICAL AMPLIFIER

This application is a divisional of application Ser. No. 09/572,854 filed May 18, 2000 now U.S. Pat. No 6,282,017, now allowed, which was a divisional of application Ser. No. 09/222,323, filed Dec. 29, 1998, now U.S. Pat. No. 6,108,122, now patented, which was a divisional of application Ser. No. 08/763,102, filed Dec. 10, 1996, now U.S. Pat. No. 6,023,366 now patented.

BACKGROUND OF THE INVENTION

1. Field of the Invention

The present invention relates generally to an optical communication system and an optical amplifier suitable for long-haul and large-capacity transmission, and more particularly to an optical communication system applicable to WDM (wavelength-division multiplexing) and an optical amplifier suitable for WDM.

2. Description of the Related Art

In recent years, research and development on application of an optical amplifier to an optical communication system have been intensively pursued. For example, importance of a booster amplifier, optical repeater, and preamplifier having an EDFA (erbium doped fiber amplifier) has become apparent.

Conventionally known is an optical amplifier comprising an optical amplifying medium for amplifying signal light and means for pumping the optical amplifying medium so that the optical amplifying medium has an amplification band including the wavelength of the signal light. In the case that the optical amplifying medium is an EDF (erbium doped fiber) having a first end and a second end, the pumping means includes a pump light source for outputting pump light having a proper wavelength, and means for supplying the pump light into the doped fiber from at least one of the first end and the second end. In the case that the optical amplifying medium is provided by a semiconductor chip, the pumping means includes means for injecting a current into the chip.

To greatly increase a transmission capacity, a WDM system (wavelength-division multiplexing system) has been proposed. The WDM system includes a first terminal station for outputting WDM signal light (wavelength-division multiplexed signal light) obtained by wavelength-division multiplexing a plurality of optical signals having different wavelengths, an optical transmission line for transmitting the WDM signal light output from the first terminal station, and a second terminal station for receiving the WDM signal light transmitted through the optical transmission line. To increase a transmission distance in the WDM system, one or more optical repeaters each having an optical amplifier are provided in the optical transmission line.

In applying the optical amplifier to the WDM system, gain tilt occurring in the optical amplifier must be considered. The gain tilt is based on the wavelength dependence of gain. In an EDFA, for example, the gain tilt changes with a change in total input power because of characteristics of homogenous broadening of an EDF. Accordingly, in operating the WDM system or the optical repeater, it is desirable to grasp the gain tilt of the optical amplifier and maintain a constant gain tilt.

In the optical amplifier or the optical repeater, a feedback loop for ALC (automatic level control) is usually adopted, so as to maintain the output level constant. In applying the optical amplifier adopting ALC to the WDM system, a target level in ALC for maintaining output power per channel constant changes with a change in the number of channels of WDM signal light. Accordingly, the conventional optical communication system cannot easily respond to a change in the number of channels.

SUMMARY OF THE INVENTION

It is therefore an object of the present invention to provide an optical communication system which can easily respond to a change in the number of channels in WDM.

It is another object of the present invention to provide an optical amplifier which can maintain a constant gain tilt.

It is a further object of the present invention to provide an optical amplifier which can maintain a constant gain tilt and allows automatic level control.

An optical communication system to which the present invention is applicable includes first and second terminal stations, an optical transmission line connecting the first and second terminal stations, and an optical repeater provided in the optical transmission line. The first terminal station includes a plurality of optical transmitters for outputting optical signals having different wavelengths, and a means for wavelength-division multiplexing the optical signals to output WDM signal light. The WDM signal light is transmitted by the optical transmission line, and received by the second terminal station. The optical repeater includes an optical amplifier for amplifying the WDM signal light.

In accordance with a first aspect of the present invention, the first terminal station further includes a means for detecting the number of channels of the WDM signal light, and a means for transmitting supervisory information indicating the number of channels to the optical repeater. The optical repeater further includes a means for detecting an output level of the optical amplifier, and a means for controlling the optical amplifier so that the output level detected becomes a target level. In the optical repeater, for example, the target level is set according to the supervisory information transmitted from the first terminal station.

In accordance with a second aspect of the present invention, the optical repeater further includes a means for detecting an output level of the optical amplifier, and a means for controlling the optical amplifier so that the output level detected becomes a target level. The target level is constant irrespective of the number of the optical transmitters being operated. Preferably, the optical signals to be output from some of the plurality of optical transmitters being operated are modulated by main signals, and the optical signals to be output from the other optical transmitters not being operated are continuous waves.

In accordance with a third aspect of the present invention, the optical amplifier includes an optical amplifying medium, a means for pumping the optical amplifying medium so that the optical amplifying medium has an amplification band including the wavelengths of the WDM signal light, a light source for outputting compensation light having a wavelength included in the amplification band but different from the wavelengths of the WDM signal light, and a means for supplying the WDM signal light and the compensation light to the optical amplifying medium. The optical repeater further includes a means for detecting an output level of the optical amplifier, a means for controlling the optical amplifier so that the output level detected becomes a target level, and a means for controlling power of the compensation light so that the target level becomes constant irrespective of the number of channels of the WDM signal light.

In accordance with a fourth aspect of the present invention, there is provided an optical amplifier comprising an optical amplifying medium having a first end and a second end, the first end receiving signal light; a first means for pumping the optical amplifying medium so that the optical amplifying medium has an amplification band including a wavelength of the signal light; a second means operatively connected to the first end of the optical amplifying medium, for monitoring spectral characteristics of amplified spontaneous emission propagating in a direction opposite to a propagation direction of the signal light in the optical amplifying medium; and a third means for controlling a gain in the amplification band so that the spectral characteristics are maintained.

In accordance with a fifth aspect of the present invention, there is provided an optical amplifier comprising an optical amplifying medium having an optical waveguide structure into which signal light is supplied; a means for pumping the optical amplifying medium so that the optical amplifying medium has an amplification band including a wavelength of the signal light; a means for extracting spontaneous emission leaked sideways from the optical waveguide structure; a means for monitoring spectral characteristics of the spontaneous emission; and a means for controlling a gain in the amplification band so that the spectral characteristics are maintained.

In accordance with a sixth aspect of the present invention, there is provided an optical amplifier comprising first and second optical amplifier units and a means for cascading the first and second optical amplifier units. Each of the first and second optical amplifier units has the configuration of the optical amplifier in accordance with the fourth aspect of the present invention. This optical amplifier further comprises an optical attenuator having a variable attenuation factor, for attenuating amplified signal light output from the first optical amplifier unit; a means for branching amplified signal light output from the second optical amplifier unit into first branch light and second branch light; a photodetector for receiving the first branch light; and a means for controlling the attenuation factor of the optical attenuator so that an output level of the photodetector becomes constant.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 3A is a block diagram showing a concrete example of the optical repeater shown in FIG. 2;

FIG. 16 is a block diagram showing a second preferred embodiment of the optical amplifier;

DESCRIPTION OF THE PREFERRED EMBODIMENTS

Some preferred embodiments of the present invention will now be described in detail with reference to the attached drawings.

Figure 1:
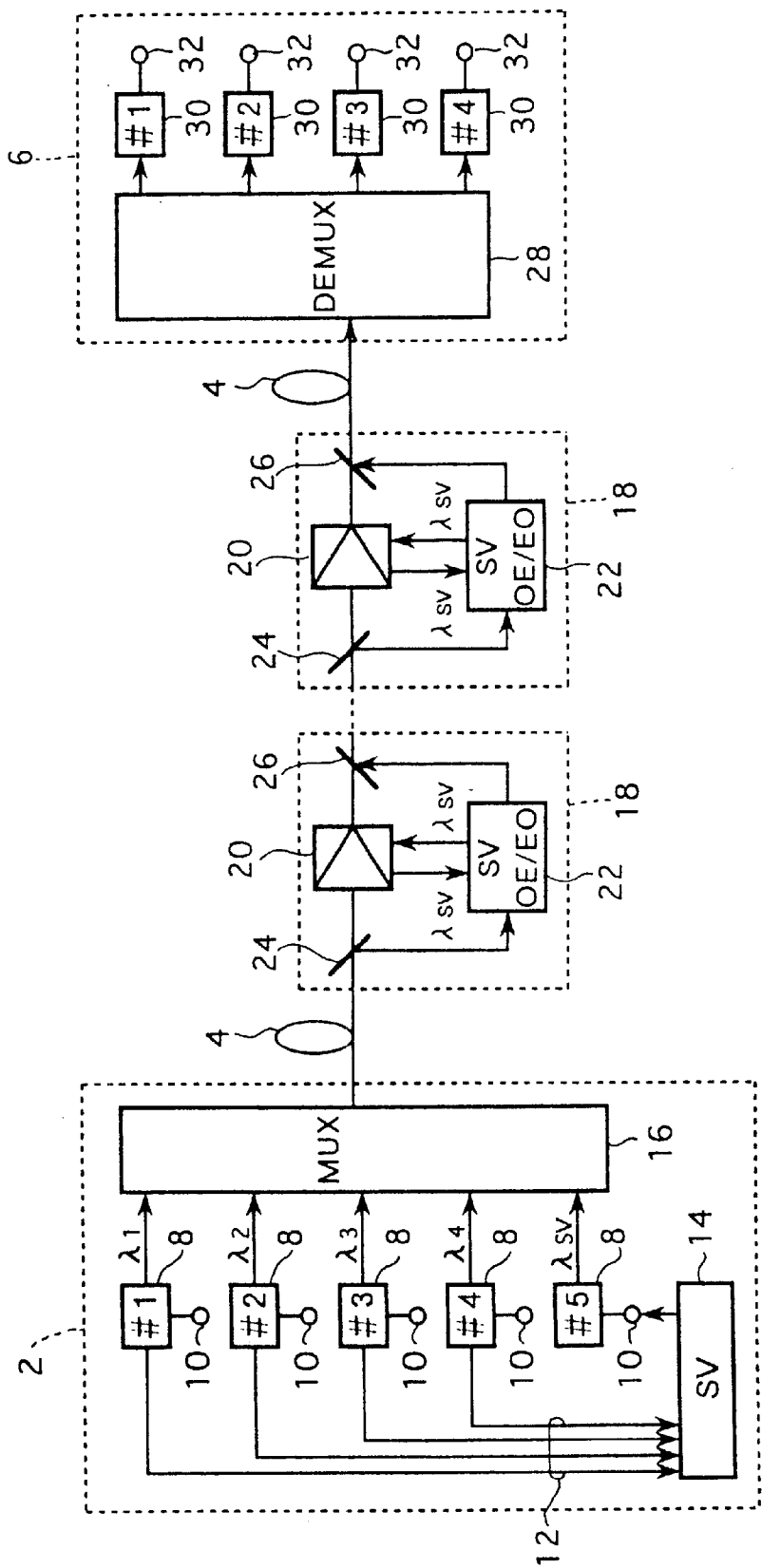
FIG. 1 is a block diagram of a WDM system to which the present invention is applicable.

FIG. 1 is a block diagram of a WDM system to which the present invention is applicable. This system includes a transmitting station 2 for outputting WDM signal light, an optical fiber transmission line 4 for transmitting the WDM signal light output from the transmitting station 2, and a receiving station 6 for receiving the WDM signal light transmitted through the optical fiber transmission line 4.

The transmitting station 2 has a plurality of optical transmitters 8 (#1 to #5). Each optical transmitter 8 has a terminal 10 for receiving a drive signal. Each optical transmitter 8 outputs signal light(optical signal) having a predetermined wavelength given by direct modulation of a laser diode or by modulation of CW light (continuous wave light) from a laser diode by an optical modulator. Status signals 12 from the optical transmitters 8 (#1 to #4) are supplied to a SV circuit (supervisory circuit) 14. Each status signal 12 includes a flag representing whether or not the corresponding optical transmitter 8 is in operation. The SV circuit 14 outputs supervisory information including the number of the optical transmitters 8 being operated, that is, the number of channels of WDM signal light. The supervisory information from the SV circuit 14 is input to the terminal 10 of the optical transmitter 5 (#5), and an optical signal having a wavelength $\lambda_{sv}$ modulated by the supervisory information is output from the optical transmitter 8 (#5). The optical transmitters 8 (#1 to #4) output optical signals having wavelengths $\lambda_1$ to $\lambda_4$ modulated by transmission data (main signals) of the respective channels. The optical signals from all the optical transmitters 8 are combined together by a multiplexer (MUX) 16, and the WDM signal light thus obtained is then output to the optical transmission line 4.

Two optical repeaters 18 are provided in the optical transmission line 4. Three or more optical repeaters 18 may be provided or one optical repeater 18 may be provided. Each optical repeater 18 has an optical amplifier 20 for amplifying the WDM signal light and outputting amplified WDM signal light, and a SV circuit (supervisory circuit) 22 for inputting/outputting the supervisory information transmitted from the transmitting station 2 from/to the optical amplifier 20. Each optical repeater 18 further has an optical coupler 24 to supply the optical signal having the wavelength $\lambda_{sv}$ modulated by the supervisory information in such a manner as to bypass the optical amplifier 20, so that an updated optical signal (having the wavelength $\lambda_{sv}$) output from the SV circuit 22 is joined to the optical fiber transmission line 4 by an optical coupler 26.

In the present application, the term of "an optical repeater provided in an optical transmission line" may be used as a representative of optical amplifiers such as an optical post-amplifier, an optical pre-amplifier, and so on.

The receiving station 6 has a demultiplexer (DEMUX) 28 for branching the WDM signal light transmitted by the optical fiber transmission line 4, and a plurality of optical receivers 30 (#1 to #4) for demodulating the transmission data of all the channels according to the WDM signal light branched. The transmission data demodulated by each optical receiver 30 is output from a terminal 32 of the corresponding optical receiver 30.

Figure 2:
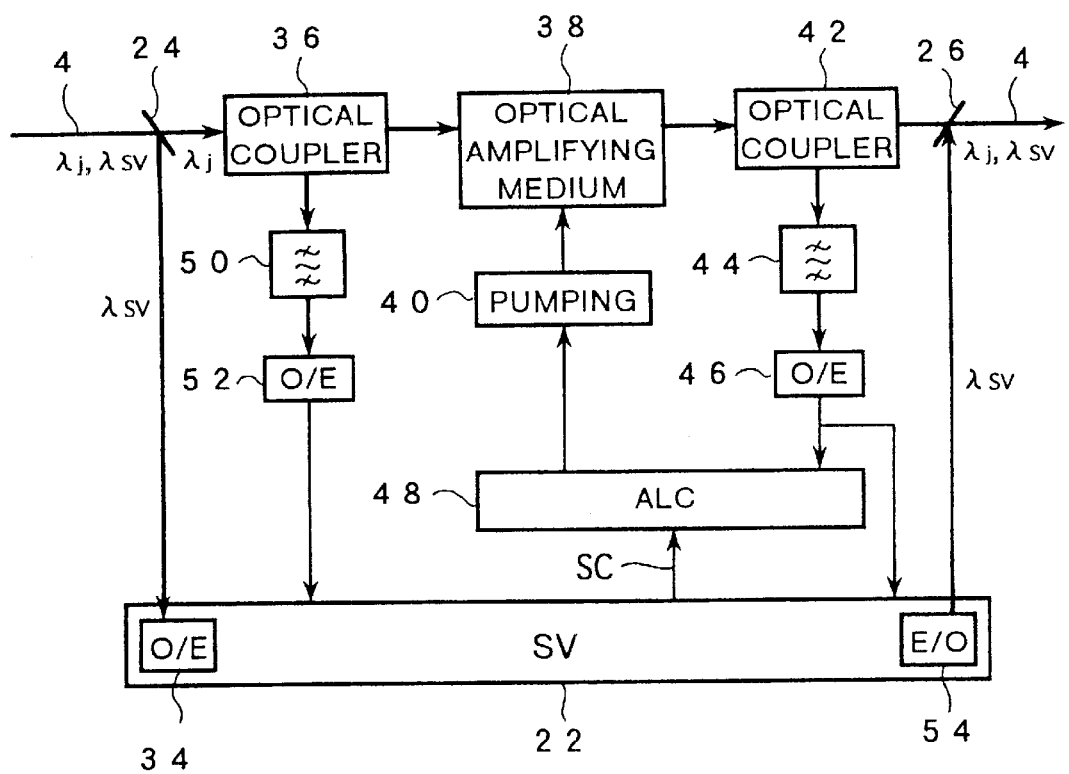
FIG. 2 is a block diagram showing a first preferred embodiment of an optical repeater.

FIG. 2 is a block diagram showing a first preferred embodiment of the optical repeater. This optical repeater may be used as each optical repeater 18 shown in FIG. 1.

Throughout the drawings, substantially the same parts are denoted by the same reference numerals.

The signal light having the wavelength $\lambda_{sv}$ branched off from the optical fiber transmission line 4 by the optical coupler 24 is previously modulated by the supervisory information. This signal light is input to an O/E converter (opto-electric converter) 34 incorporated in the SV circuit 22, and the supervisory information is regenerated according to an output signal from the O/E converter 34. The WDM signal light having the wavelengths $\lambda_j$ (j=1 to 4) passed through the optical coupler 24 is branched into first branch light and second branch light by an optical coupler 36. The first branch light is supplied to an optical amplifying medium 38. The optical amplifying medium 38 is previously pumped by pumping means 40. Accordingly, the optical amplifying medium 38 has an amplification band including the wavelengths of the WDM signal light. As the optical amplifying medium 38, a doped fiber doped with a rare earth element, e.g., an erbium doped fiber (EDF) may be used. In this case, the pumping means 40 includes a pump light source operatively connected to at least one of a first end and a second end of the doped fiber, for supplying pump light to the doped fiber. Alternatively, a semiconductor chip may be used as the optical amplifying medium 38 (semiconductor optical amplifier). In this case, the pumping means 40 includes means for applying a pumping voltage across a pair of electrodes provided in the chip to inject a current. In the following description, it is assumed that the optical amplifying medium 38 is a doped fiber and the pumping means 40 includes a pump light source.

The signal light amplified by the optical amplifying medium 38 is branched into first branch light and second branch light by an optical coupler 42. The first branch light from the optical coupler 42 is transmitted through the optical coupler 26 to the downstream optical fiber transmission line 4. The second branch light from the optical coupler 42 is supplied to an optical band-pass filter 44. The filter 44 has a pass band including the wavelengths of the WDM signal light. The light passed through the filter 44 is supplied to an O/E converter 46, and an output signal from the O/E converter 46 is supplied to an ALC circuit (automatic level control circuit) 48 and the SV circuit 22.

The ALC circuit 48 controls the pumping means 40 so that the output level of the O/E converter 46 becomes constant. More specifically, in the case that the pump light source included in the pumping means 40 is a laser diode, a drive current (bias current) for the laser diode is controlled. Of the supervisory information regenerated in the SV circuit 22, a signal SC giving the number of channels is supplied from the SV circuit 22 to the ALC circuit 48. Since the ALC circuit 48 performs the above-mentioned feedback control, the output level of this optical amplifier is stabilized so as to coincide with a target level. The target level is to be set so that output power per channel becomes constant. Accordingly, the target level is to be set according to the number of channels of the WDM signal light.

In this preferred embodiment, the target level is set according to the signal SC giving the number of channels. This will now be described more specifically.

Figure 3:
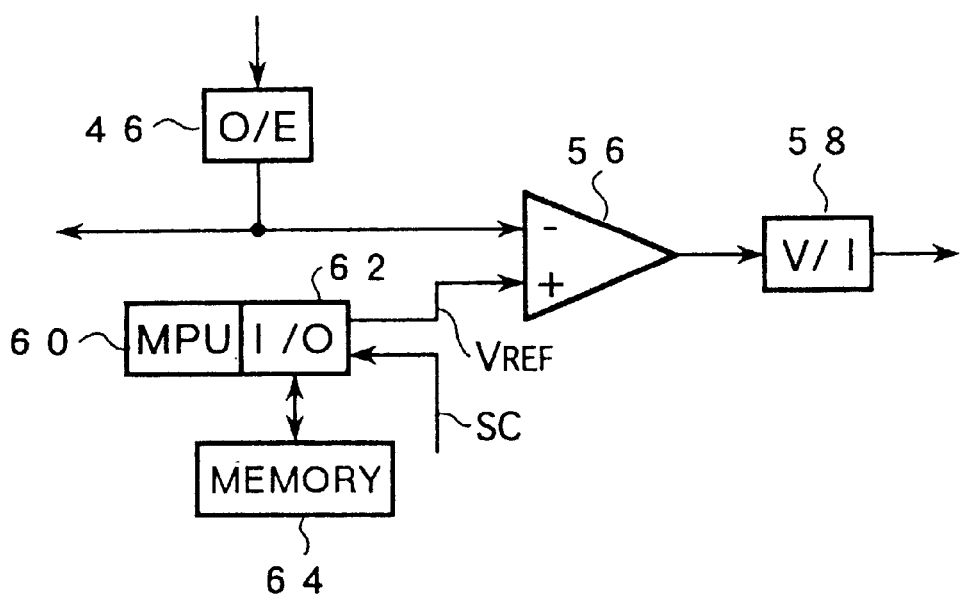
FIG. 3 is a block diagram of an ALC circuit.

FIG. 3 is a block diagram showing a specific embodiment of the ALC circuit 48 shown in FIG. 2. The ALC circuit 48 has an operational amplifier 56 for comparing the output signal (output voltage) from the O/E converter 46 with a reference voltage VREF. The output voltage from the O/E converter 46 is supplied to a minus input port of the operational amplifier 56, and the reference voltage $V_{REF}$ is supplied to a plus input port of the operational amplifier 56. The operational amplifier 56 outputs a voltage signal corresponding to a level difference between the two input ports. This voltage signal is converted into a current signal by a V/I converter 58, and the current signal is then fed back to, for example, the drive current for the pump light source in the pumping means 40 (see FIG. 2).

To set the reference voltage $V_{REF}$ according to the number of channels, an MPU (microprocessing unit) 60 is used. The signal SC giving the number of channels is taken into the MPU 60 through an I/O circuit 62, and the reference voltage $V_{REF}$ obtained according to the result of computation in the MPU 60 is supplied through the I/O circuit 62 to the operational amplifier 56. The computation in the MPU 60 is performed, for example, by referring to a data table having the signal SC giving the number of channels as an address. This data table is previously stored in a memory 64 connected through the I/O circuit 62 to the MPU 60. For example, for a signal SC giving a large number of channels, a large reference voltage ($V_{REF}$) is set, whereas for a signal SC giving a small number of channels, a small reference voltage ($V_{REF}$) is set.

In this preferred embodiment as described above, the target value in ALC is set according to the number of channels of the optical transmitters 8 being operated in the transmitting station (see FIG. 1). Accordingly, output power per channel from the optical-amplifier can be maintained constant irrespective of a change in the number of channels. Accordingly, by using the optical repeater as shown in FIG. 2, the WDM system shown in FIG. 1 can be easily adapted to a change in the number of WDM channels.

Referring again to FIG. 2, a further function of the SV circuit 22 will be described. The second branch light from the optical coupler 36 is supplied to an optical band-pass filter 50 having a pass band including the wavelengths of the WDM signal light. The light output from the filter 50 is input to an O/E converter 52, and an output signal from the O/E converter 52 is supplied to the SV circuit 22. The output signal from the O/E converter 46 on the output side is also supplied to the SV circuit 22. Accordingly, the levels of input light and output light and the gain of this optical amplifier can be obtained in the SV circuit 22. By adding such information to the supervisory information transmitted from the transmitting station 2, the latter is updated. Then, the updated supervisory information is transmitted to the downstream optical repeater 18 or the receiving station 6. The updated supervisory information is converted into signal light having the wavelength $\lambda_{sv}$ by an E/O converter 54 incorporated in the SV circuit 22, and this signal light is then output to the optical fiber transmission line 4 by the optical coupler 26.

The updated supervisory information may include a status information indicating the number of channels which determines the operation of the corresponding optical amplifier. Through the feature of the status information, the receiving station 6(shown in FIG. 1) can detect whether or not the corresponding optical amplifier operates based on the supervisory information sent from the transmitting station 2. This feature of the present invention is very important because the number of channels is one of key parameters for operating optical amplifiers.

FIG. 3A is a block diagram showing a concrete example of the optical amplifier shown in FIG. 2. In this example, an EDF(erbium doped fiber) 39 is used as the optical amplifying medium 38. In order to prevent a resonance in the EDF 39, optical isolators 41A and 41B is connected to both ends of the EDF 39. The pumping means 40 includes a laser diode 43 outputting pump light and an optical coupler 45 for supplying the pump light to the EDF 39.

Figure 4:
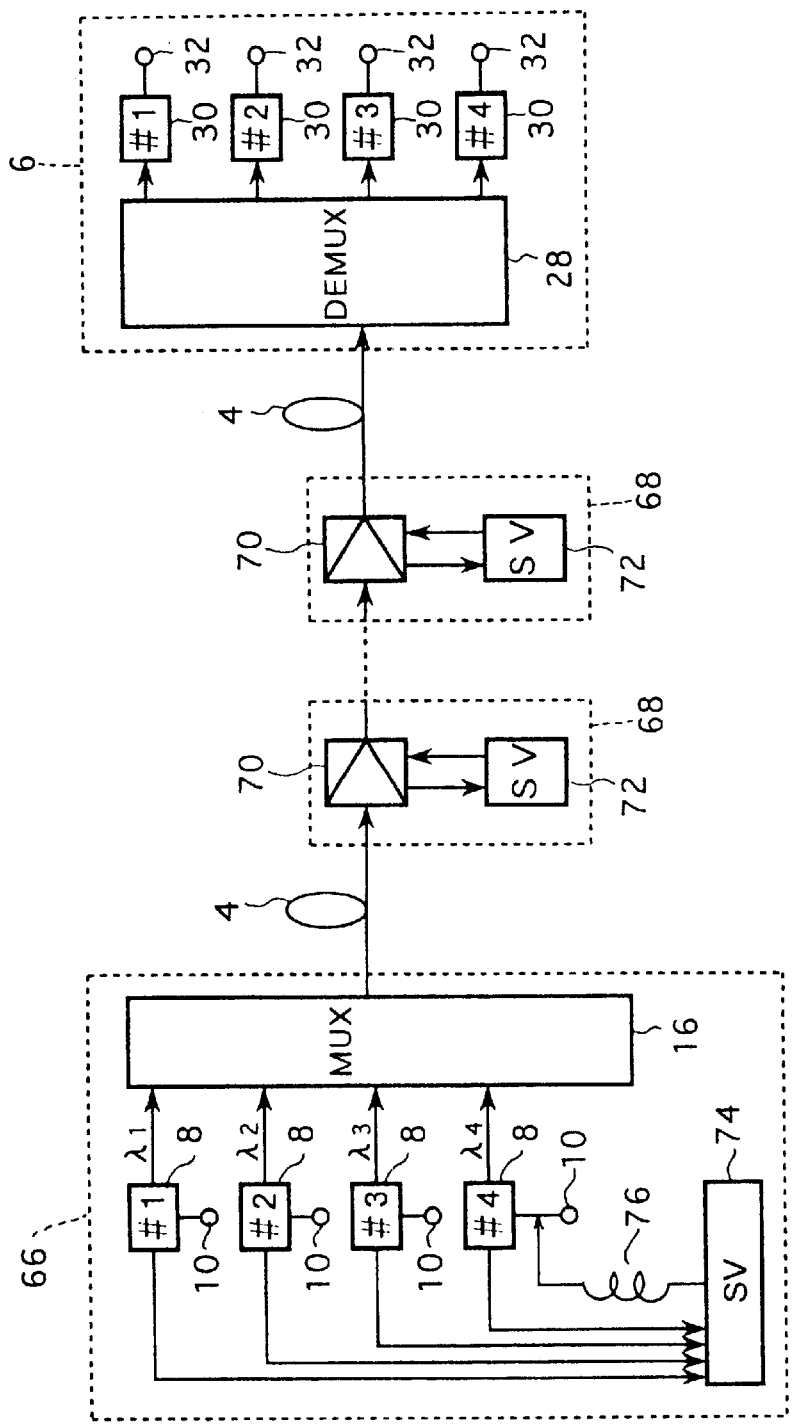
FIG. 4 is a block diagram of another WDM system to which the present invention is applicable.

FIG. 4 is a block diagram of another WDM system to which the present invention is applicable. This system includes a transmitting station 66 for outputting WDM signal light, an optical fiber transmission line 4 for transmitting the WDM signal light output from the transmitting station 66, and a receiving station 6 for receiving the WDM signal light transmitted through the optical fiber transmission line 4. Two optical repeaters 68 are provided in the optical fiber transmission line 4. Three or more optical repeaters 68 may be provided or one optical repeater 68 may be provided. Each optical repeater 68 has an optical amplifier 70 and a SV circuit 72 for inputting/outputting supervisory information directly from/to the optical amplifier 70.

The optical transmitter 8 (#5) for mainly transmitting the supervisory information in the system shown in FIG. 1 is not used in this preferred embodiment. That is, optical transmitters 8 (#1 to #4) included in the transmitting station 66 can output optical signals modulated by transmission data having wavelengths $\lambda_1$ to $\lambda_4$, respectively. Status signals representing the operational conditions of the optical transmitters 8 (#1 to #4) are supplied to a SV circuit 74. The SV circuit 74 generates a tone signal according to the supervisory information including the number of channels of the WDM signal light. This tone signal has a frequency sufficiently lower than that of a main signal (transmission data in each optical transmitter 8). The tone signal is supplied from the SV circuit 74 through a low-pass filter 76 to the optical transmitter 8 (#4). The tone signal is superimposed on a modulating signal (transmission data) to be supplied from a terminal 10 to the optical transmitter 8 (#4).

Figure 5:
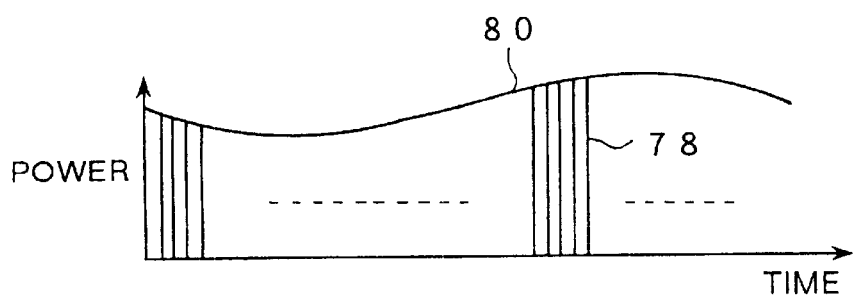
FIG. 5 is a graph for illustrating a tone signal.

Referring to FIG. 5, there is shown a waveform chart of the tone signal. A tone signal 80 having a speed sufficiently lower than that of a main signal 78 is superimposed on one of the WDM optical signals. The tone signal 80 may be obtained by performing modulation based on the supervisory information with low-frequency tone components used as a subcarrier. The frequencies of the tone components are set to 1 KHz to 1 MHz, for example, so that each frequency component is not attenuated in the optical amplifier. In the optical communication art, such a technique for superimposing the tone signal is known as a subcarrier overmodulation technique.

Figure 6:
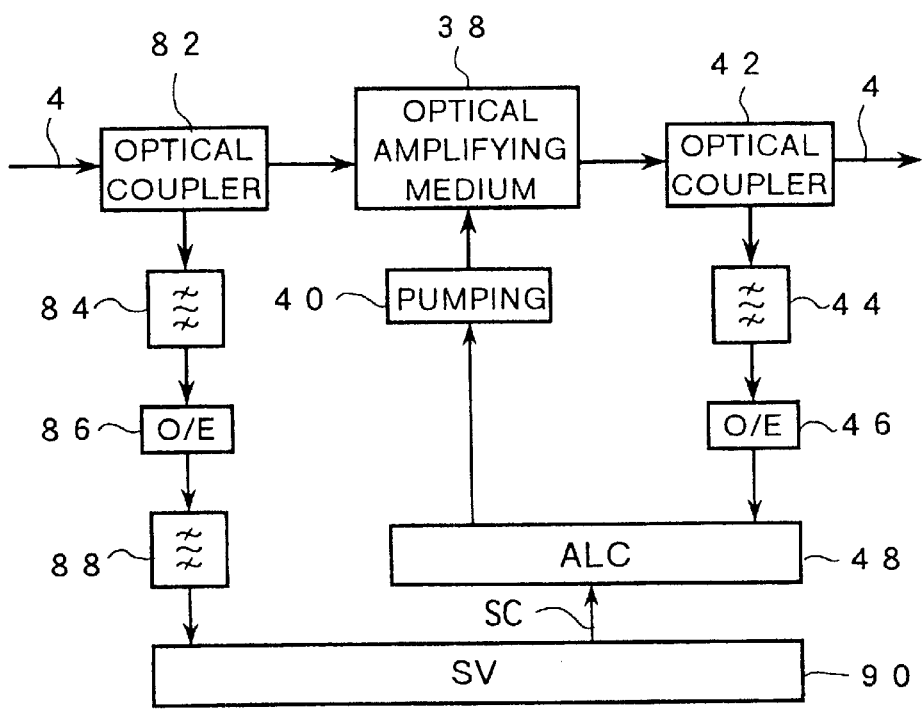
FIG. 6 is a block diagram showing a second preferred embodiment of the optical repeater.

Referring to FIG. 6, there is shown a block diagram showing a second preferred embodiment of the optical repeater. This optical repeater may be used as each optical repeater 68 shown in FIG. 4. This optical repeater has a feedback loop including an ALC circuit 48. This loop is the same as that shown in FIG. 2, so the description thereof will be omitted herein. The WDM signal light supplied from the upstream optical fiber transmission line 4 is branched into first branch light and second branch light by an optical coupler 82. The first branch light from the optical coupler 82 is supplied to an optical amplifying medium 38. The WDM signal light amplified by the optical amplifying medium 38 is transmitted through an optical coupler 42 to the downstream optical fiber transmission line 4. The second branch light from the optical coupler 82 is supplied to an optical band-pass filter 84. The filter 84 has a pass band including the wavelengths of the WDM signal light. The light output from the filter 84 is supplied to an O/E converter 86. An output signal from the O/E converter 86 is supplied to a band-pass filter 88.

The filter 88 has a pass band including the carrier frequency of the tone signal. Accordingly, the tone signal is extracted by the filter 88, and is then supplied to a SV circuit 90. In the SV circuit 90, the supervisory information is regenerated according to the tone signal, and a signal SC giving the number of channels obtained according to the supervisory information is supplied from the SV circuit 90 to the ALC circuit 48. In the ALC circuit 48, a reference voltage $V_{REF}$ (see FIG. 3) is set according to the signal SC giving the number of channels. Accordingly, optical output power per channel can be maintained constant irrespective of a change in the number of channels.

While the tone signal is superimposed on only the optical signal having the wavelength $\lambda_4$ to be output from the optical transmitter 8 (#4) in the system shown in FIG. 4, the tone signal may be superimposed on all the channels of the WDM signal light. In this case, an optical modulator is provided between the optical multiplexer 16 and the optical transmission line 4 to thereby superimpose the tone signal on the WDM signal light.

For example, the number of channels being operated may be transmitted according to the frequency of the tone signal. That is, when only one channel is in operation, a tone signal of 10 KHz is superimposed; when two channels are in operation, a tone signal of 11 KHz is superimposed; when three channels are in operation, a tone signal of 12 KHz is superimposed; and so on. Thus, the number of channels is detected according to the frequency of the tone signal.

Alternatively, the frequencies of tone signals may be previously assigned to all the channels, and the tone yea signals may be superimposed on the corresponding channels before carrying out wavelength-division multiplexing. In this case, the number of channels being operated can be detected according to the number of frequency components of the tone signals.

Figure 7:
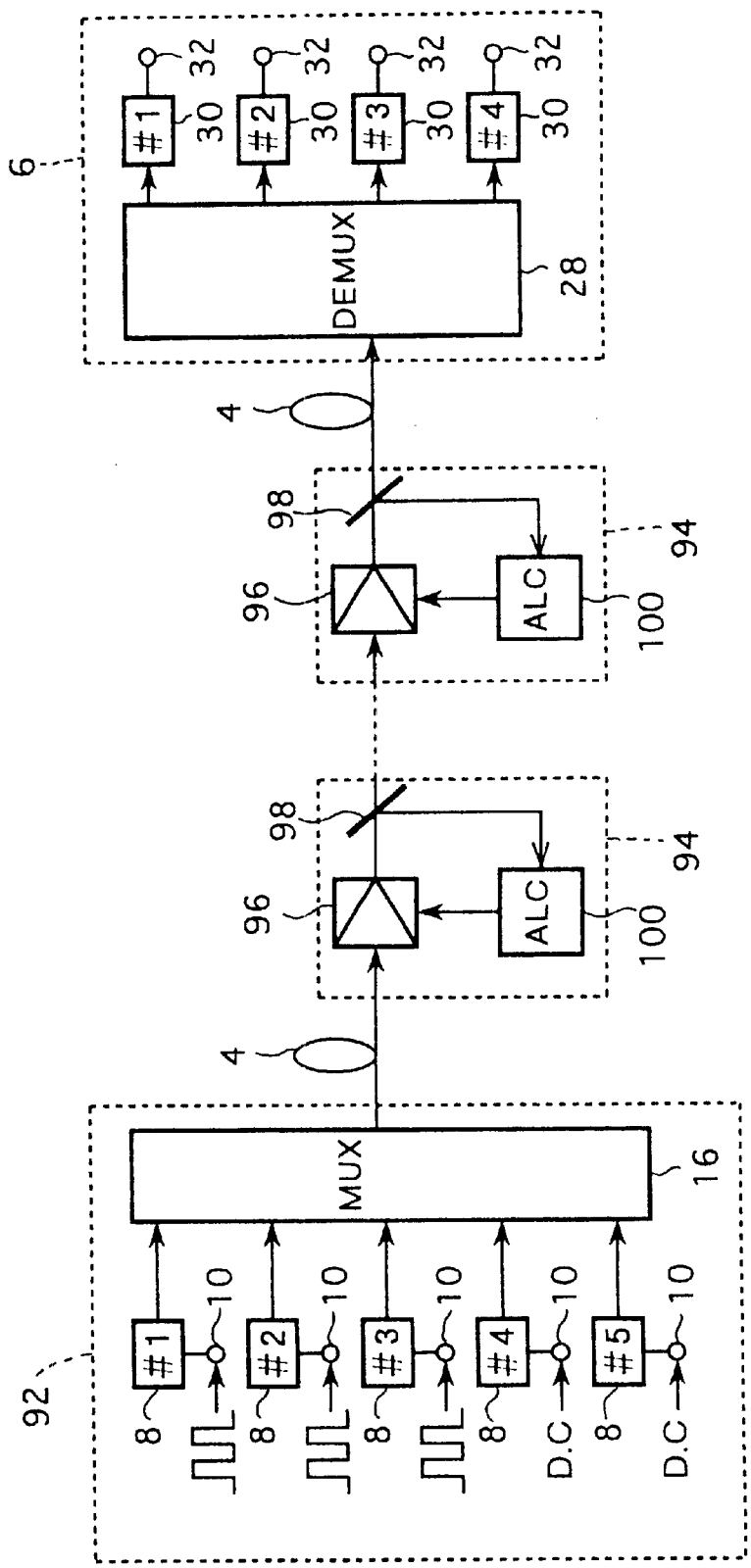
FIG. 7 is. a block diagram of still another WDM system to which the present invention is applicable.

FIG. 7 is a block diagram of still another WDM system to which the present invention is applicable. This system includes a transmitting station 92 for outputting WDM signal light, an optical fiber transmission line 4 for transmitting the WDM signal light output from the transmitting station 92, and a receiving station 6 for receiving the WDM signal light transmitted through the optical fiber transmission line 4. Two optical repeaters 94 are provided in the optical fiber transmission line 4. Three or more optical repeaters 94 may be provided or one optical repeater 94 may be provided. Each optical repeater 94 has an optical amplifier 96 for amplifying the WDM signal light and an ALC circuit 100 for controlling the optical amplifier 96 so that the output level of the optical amplifier 96 becomes a target level. A part of the WDM signal light output from the optical amplifier 96 is branched off by an optical coupler 98, and the ALC circuit 100 controls the optical amplifier 96 so that the power of the branch light from the optical coupler 98 becomes constant.

The transmitting station 92 has five optical transmitters 8 (#1 to #5) capable of generating optical signals having different wavelengths, and an optical multiplexer 16 for wavelength-division multiplexing the optical signals to output WDM signal light. In this preferred embodiment, the three optical transmitters 8 (#1 to #3) are in operation, and the other two optical transmitters (#4 and #5) are not in operation. That is, pulse signals corresponding to main signals are supplied to drive terminals 10 of the optical transmitters 8 (#1 to #3), and DC biases are supplied to drive terminals 10 of the other optical transmitters 8 (#4 and #5). Accordingly, the optical signals to be output from the optical transmitters 8 (#1 to #3) are modulated by the respective main signals, and the light to be output from the optical transmitters 8 (#4 and #5) is CW light (continuous wave light).

The reason why the optical transmitters 8 (#4 and #5) not being operated are intended to output the CW light having no relation to the main signals is to make constant the total power of the WDM signal light to be supplied to each optical repeater 94. By thus making the total power constant, the target level in the ALC circuit 100 can be maintained constant in each optical repeater 94 irrespective of the number of channels being operated. According to this preferred embodiment, it is therefore unnecessary to change the target level for ALC in each optical repeater 94, thereby allowing the ALC circuit to be simplified.

In the case that the optical amplifier 96 is an EDFA, the subject to be controlled by the ALC circuit 100 may be set as the power of pump light to be supplied to an EDF. In the case that the pump light is used for control of gain tilt, the subject to be controlled by the ALC circuit 100 may be set as the attenuation factor of an optical attenuator (not shown) provided upstream or downstream of the optical amplifier 96.

Figure 8:
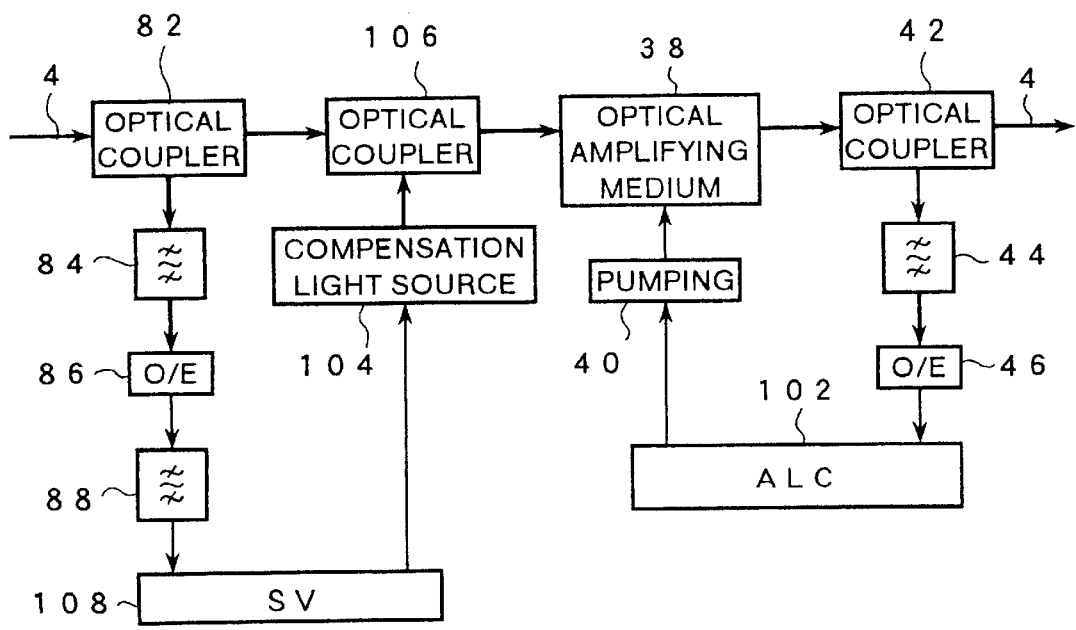
FIG. 8 is a block diagram showing a third preferred embodiment of the optical repeater.

FIG. 8 is a block diagram showing a third preferred embodiment of the optical repeater. This optical repeater may be used instead of each optical repeater 68 in the WDM system shown in FIG. 4. This optical repeater has a feedback loop for ALC. An ALC circuit 102 included in this loop controls the power of pump light in pumping means 40 so that the output level of the optical amplifier becomes a target level. In this preferred embodiment, the target level is constant irrespective of the number of channels of the WDM signal light.

To this end, this preferred embodiment employs a compensation light source 104 for outputting compensation light having a wavelength included in the amplification band but different from the wavelengths of the WDM signal light. The first branch light from the optical coupler 82 and the compensation light from the light source 104 are combined together in an optical coupler 106, and then supplied to an optical amplifying medium 38. The second branch light from the optical coupler 82 is supplied to an optical band-pass filter 84 having a pass band including the wavelengths of the WDM signal light. The light output from the filter 84 is supplied to an O/E converter 86. As previously described in the system shown in FIG. 4, the output signal from the O/E converter 86 includes a tone signal modulated by supervisory information. This tone signal is extracted by a band-pass filter 88 and supplied to a SV circuit 108. The SV circuit 108 controls the power of the compensation light to be output from the compensation light source 104 according to the number of channels of the WDM signal light determined by regeneration of the supervisory information, thereby maintaining constant the target level in the ALC circuit 102 irrespective of the number of channels being operated.

According to this preferred embodiment, the compensation light and the WDM signal light are supplied to the optical amplifying medium 38. Accordingly, by setting the power of the compensation light according to the number of channels being operated, it is unnecessary to change the target level in the ALC circuit 102.

Figure 9:
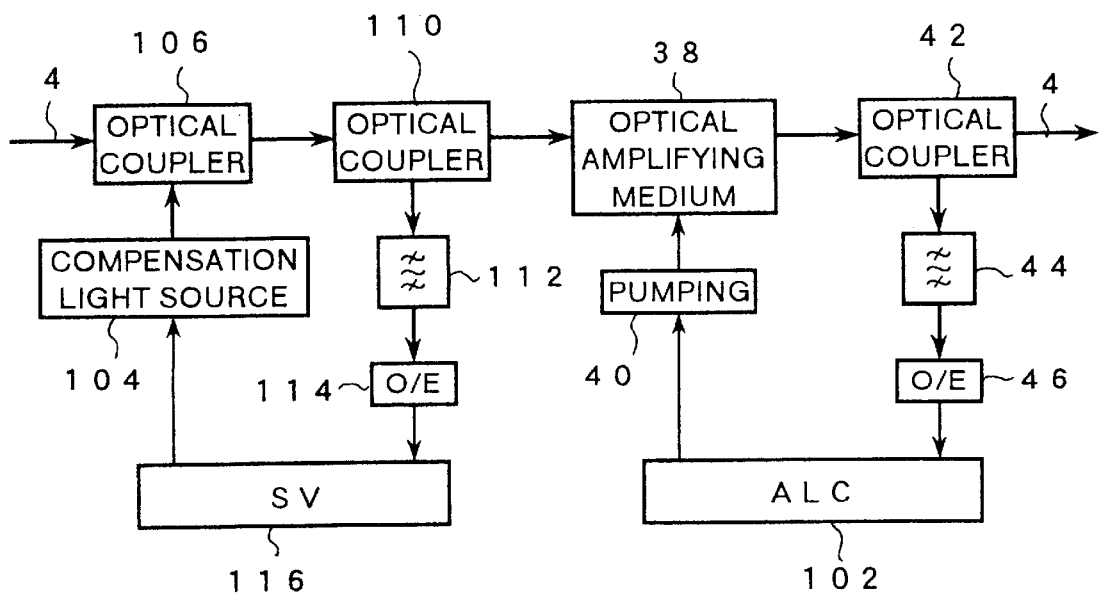
FIG. 9 is a block diagram showing a fourth preferred embodiment of the optical repeater.

FIG. 9 is a block diagram showing a fourth preferred embodiment of the optical repeater. This optical repeater may be used instead of each optical repeater 68 in the WDM system shown in FIG. 4. This optical repeater has a feedback loop including an ALC circuit 102 similar to that shown in FIG. 8 and another feedback loop.

The compensation light from a compensation light source 104 is added to WDM signal light in an optical coupler 106, and output light from the optical coupler 106 is supplied through an optical coupler 110 to an optical amplifying medium 38. In the optical coupler 110, parts of the WDM signal light and the compensation light are branched off, and the resultant branch light is supplied to an optical band-pass filter 112. The filter 112 has a pass band including the wavelengths of the WDM signal light and the wavelength of the compensation light. Output light from the filter 112 is input to an O/E converter 114. A SV circuit 116 controls the power of the compensation light so that the output level of the O/E converter 114 becomes constant.

The total power of the WDM signal light and the compensation light to be supplied to the optical amplifying medium 38 is reflected on the output level of the O/E converter 114. Accordingly, by providing such a feedback loop upstream of the optical amplifying medium 38, the total power of the WDM signal light and the compensation light can be maintained constant. By thus maintaining the total power constant, the target level in the ALC circuit 102 can be made constant irrespective of the number of channels of the WDM signal light, thereby allowing the ALC circuit 102 to be simplified. By thus providing the feedback loop including the SV circuit 116, this optical repeater in this preferred embodiment need not receive information on the number of channels of the WDM signal light. Accordingly, in the case that the optical repeater shown in FIG. 9 is applied to the system shown in FIG. 4, the SV circuit 74 in the transmitting station 66 shown in FIG. 4 may be omitted.

In the optical repeaters shown in FIGS. 8 and 9, the ALC circuit 102 controls the power of the pump light in the pumping means 40. However, in the case that the power of the pump light is used for control of gain tilt, the ALC circuit 102 may control the attenuation factor of an optical attenuator (not shown) provided upstream or downstream of the optical amplifying medium 38.

Figure 10:
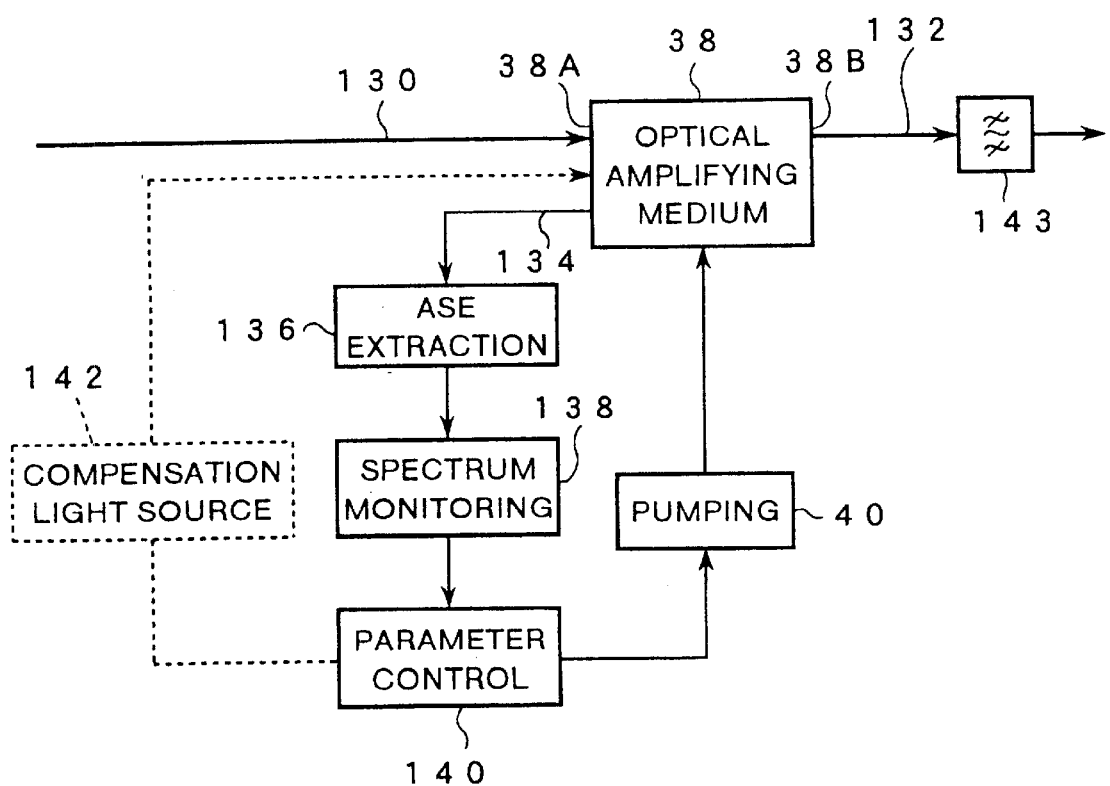
FIG. 10 is a block diagram showing a first basic configuration of an optical amplifier.

FIG. 10 is a block diagram showing a first basic configuration of the optical amplifier according to the present invention. Like the optical amplifier included in the optical repeater described above, the optical amplifier shown in FIG. 10 has an optical amplifying medium 38 and pumping means 40. When signal light 130 is supplied to a first end 38A of the optical amplifying medium 38 being pumped, amplified signal light 132 is output from a second end 38B of the optical amplifying medium 38. In such a condition that the optical amplifying medium 38 is being pumped so as to have an amplification band, ASE (amplified spontaneous emission) is generated in the optical amplifying medium 38. The ASE is output not only from the second end 38B in the same direction as the propagation direction of the signal light 132, but also from the first end 38A in the direction opposite to the propagation direction of the signal light 132 as shown by 134. The ASE 134 propagating opposite to the signal light 132 is extracted by ASE extracting means 136. According to the extracted ASE 134, monitoring means 138 monitors spectral characteristics giving the wavelength dependence of the power of the ASE 134. Parameter control means 140 controls a parameter on which the gain tilt in the amplification band of the optical amplifying medium 38 is dependent (or the gain itself) so that the spectral characteristics monitored above are maintained.

As the optical amplifying medium 38, a doped fiber doped with a rare earth element, such as an EDF, may be used. Alternatively, a semiconductor chip may be used (semiconductor optical amplifier). In the latter case, the pumping means 40 includes means for injecting a current into the chip. Specifically, a pumping voltage is applied across a pair of electrodes of the semiconductor optical amplifier. The pumping means 40 suitable for the doped fiber includes a pump light source for outputting pump light, and optical coupling means operatively connected to at least one of the first end 38A and the second end 38B of the optical amplifying medium 38 to supply the pump light to the optical amplifying medium 38.

In this specification, the wording that optical components are operatively connected to each other includes the case that the optical components are directly connected together by fiber connection or spatial connection using a collimated beam, and further includes the case that the optical components are connected through another optical component such as an optical filter.

In the case that the pumping means 40 includes the pump light source, the power of the pump light may be adopted as the parameter to be controlled by the parameter control means 140. In this case, the pump light source cannot be included in a feedback loop of ALC for making constant the power of the amplified signal light 132 (total gain of the optical amplifier). Therefore, in performing the ALC, a feedback loop including an optical attenuator having a variable attenuation factor may be provided.

In the case that this optical amplifier includes a compensation light source 142 for supplying to the optical amplifying medium 38 compensation light having a wavelength included in the amplification band of the optical amplifying medium 38, the parameter to be controlled by the parameter control means 140 may be the power of the compensation light. In this case, the pump light source can be included in the feedback loop for the ALC. The wavelength of the compensation light is set different from the wavelength of the signal light.

In the case that this optical amplifier is applied to a WDM system, WDM signal light is supplied into the optical amplifying medium 38 from the first end 38A.

Gain characteristics of the optical amplifying medium 38, i.e., the gain tilt, are reflected on the spectral characteristics of the ASE 134. Since the ASE 134 propagates opposite to the signal light in the optical amplifying medium 38, the spectral characteristics of the ASE 134 are not influenced by the number of channels of WDM signal light, input level, and accumulated ASE in principle. Accordingly, by controlling the parameter on which the gain tilt depends so that the spectral characteristics of the ASE 134 are maintained, a constant gain tilt can be easily obtained. Specific embodiments of a monitoring method for the spectral characteristics will be hereinafter described.

Preferably, the first basic configuration of the optical amplifier shown in FIG. 10 has an optical band-pass filter 143 operatively connected to the second end 38B of the optical amplifying medium 38. The effectiveness of the filter 143 will now be described.

The spectral characteristics of forward ASE propagating in the same direction as the propagation direction of the signal light in the optical amplifying medium 38 are influenced by the input level of the signal light and accumulated ASE. To the contrary, the spectral characteristics of backward ASE propagating in the direction opposite to the propagation direction of the signal light in the optical amplifying medium 38 are not influenced by these factors in principle. However, in actual, if there is any little reflection on the output side of the optical amplifying medium 38, there is a possibility that accumulated ASE may be reflected, and this reflected accumulated ASE may then be amplified in the optical amplifying medium 38 to mix into the backward ASE. Accordingly, in the case that such mixing of the accumulated ASE into the backward ASE becomes a problem, the optical band-pass filter 143 having a proper pass band is used.

Figure 11A:
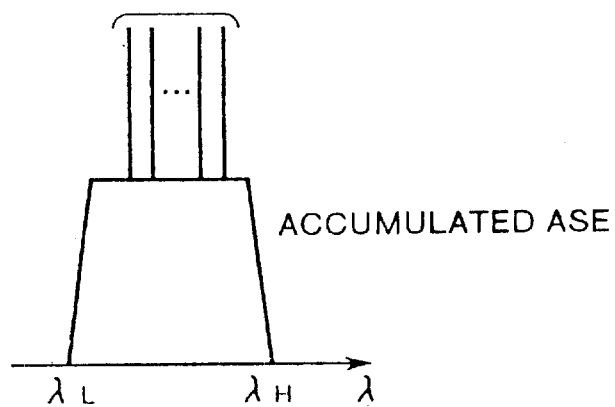
FIGS. 11A and 11B are graphs for illustrating preferred embodiments for removing the influence of accumulated ASE.

Referring to FIG. 11A, there is shown a preferable pass band of the optical band-pass filter 143. The shortest wavelength $\lambda_L$ in the pass band is set slightly shorter than the shortest wavelength of the WDM signal light, and the longest wavelength $\lambda_H$ in the pass band is set slightly longer than the longest wavelength of the WDM signal light. With this setting, the power of accumulated ASE can be effectively reduced.

Figure 11B:
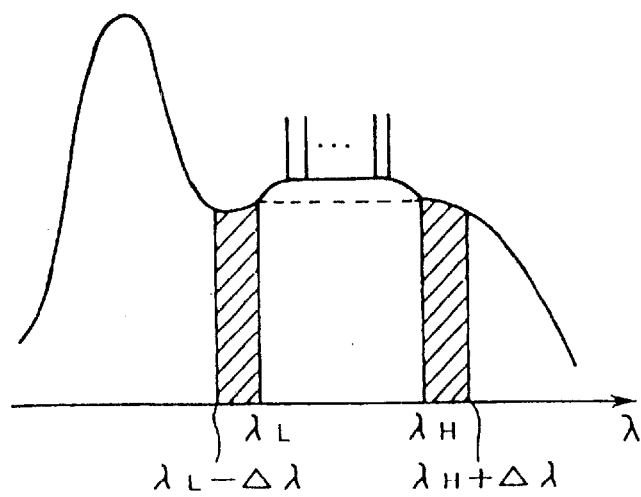
Figure 14:
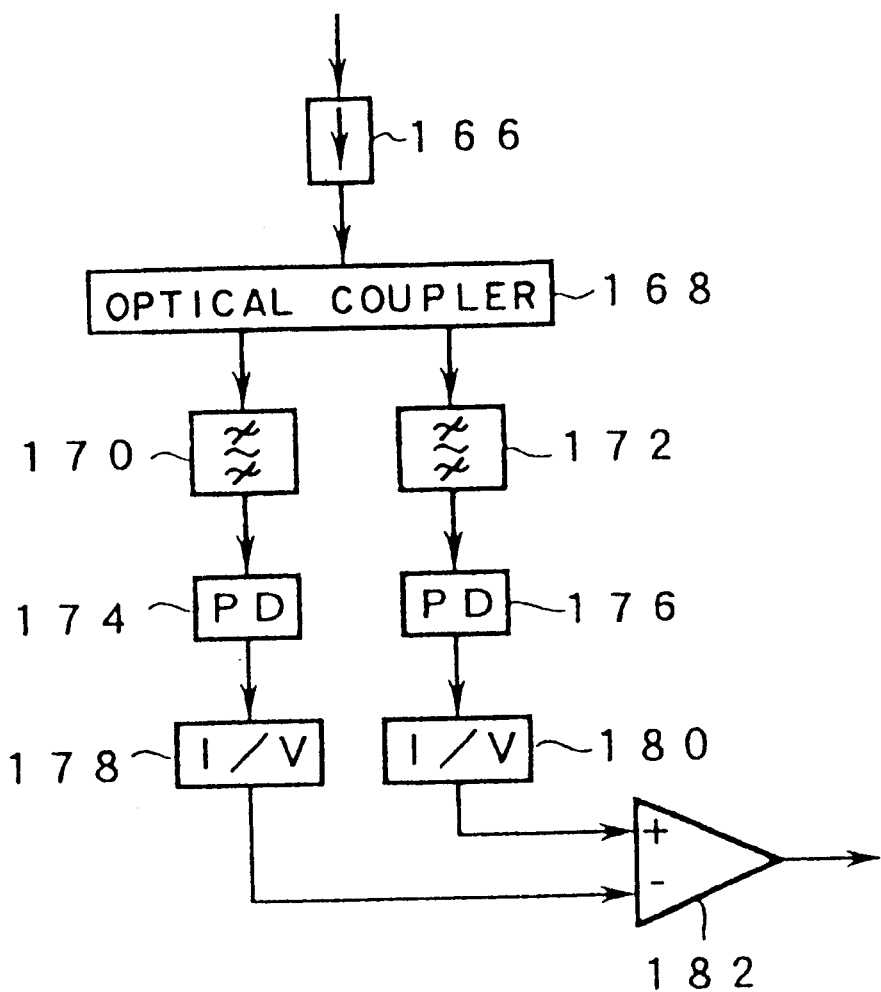
FIG. 14 is a block diagram of a spectrum monitor.

Preferably, the monitoring means 138 shown in FIG. 10 has two optical band-pass filters having different pass bands (e.g., optical band-pass filters 170 and 172 of a spectrum monitor shown in FIG. 14). In this case, as shown in FIG. 11B, the shortest wavelength and the longest wavelength in the pass band of one of the two filters are set to $\lambda_L - \Delta\lambda$ and $\lambda_L$, respectively, whereas the shortest wavelength and the longest wavelength in the pass band of the other filter are set to $\lambda_H$ and $\lambda_H + \Delta\lambda$, respectively. With this setting, even if a reflected component of the accumulated ASE is mixed into the backward ASE, no influence of such mixing appears to a result of monitoring.

Figure 12:
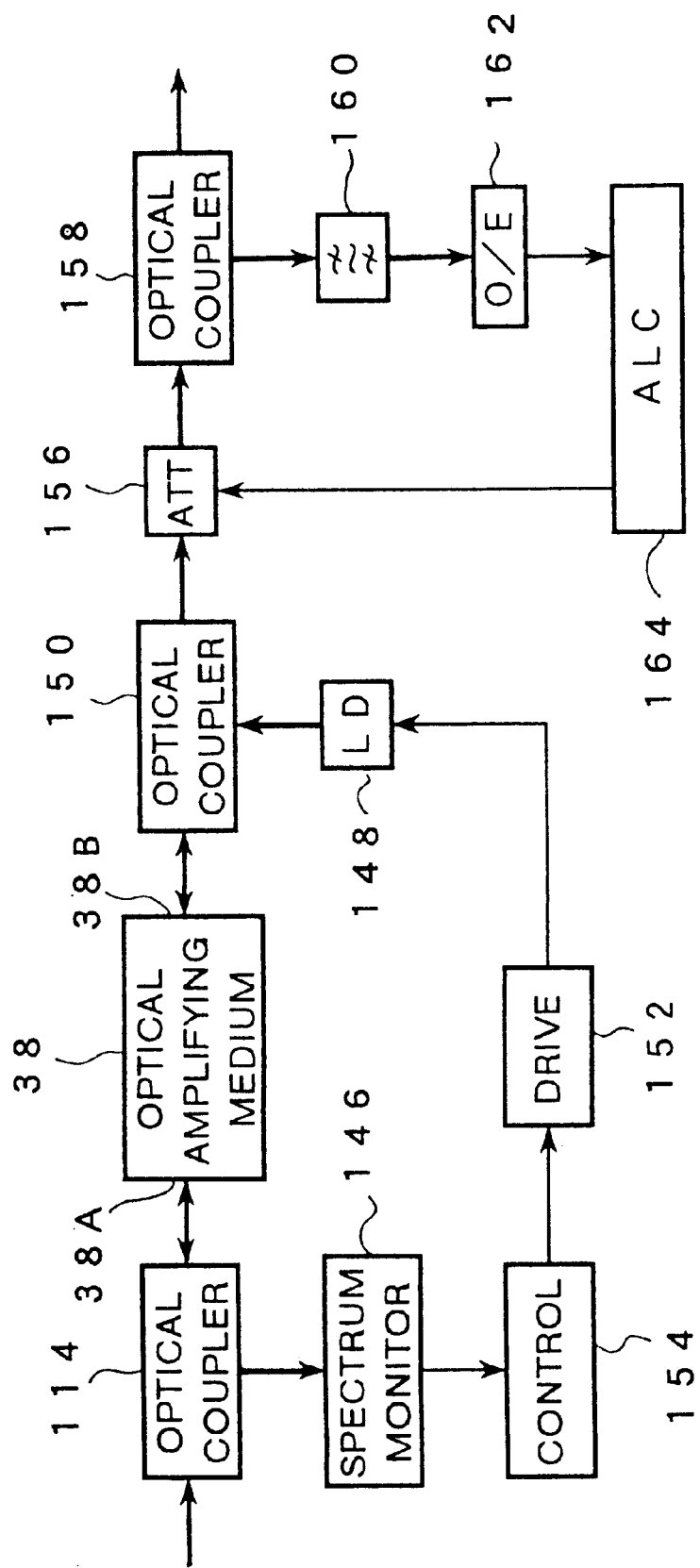
FIG. 12 is a block diagram showing a first preferred embodiment of the optical amplifier.

FIG. 12 is a block diagram showing a first preferred embodiment of the optical amplifier according to the present invention. Signal light to be amplified is supplied through an optical coupler 144 into an optical amplifying medium 38 from its first end 38A. The ASE propagating in the direction opposite to the signal light in the optical amplifying medium 38 is extracted by the optical coupler 144. The extracted ASE is supplied to a spectrum monitor 146. As the optical coupler 144, a fiber fused type of optical coupler, a WDM coupler that is a special form of this type of optical coupler, or an optical circulator may be used. A laser diode 148 as a pump light source is used to pump the optical amplifying medium (e.g., doped fiber) 38. Pump light output from the laser diode 148 is supplied to the optical amplifying medium 38 through an optical coupler 150 connected to a second end 38B of the optical amplifying medium 38. The laser diode 148 is supplied with a bias current from a drive circuit 152. The power of the pump light can be controlled according to the bias current.

The ASE spectral characteristics monitored by the spectrum monitor 146 is supplied to a control circuit 154. The control circuit 154 controls the bias current to be supplied from the drive circuit 152 to the laser diode 148 so that the spectral characteristics from the spectrum monitor 146 are maintained.

In this preferred embodiment, the bias current for the laser diode 148 for outputting the pump light is included in a feedback loop for maintaining the gain tilt. Accordingly, ALC cannot be performed by using the bias current for the laser diode 148. To perform ALC, the amplified signal light output from the second end 38B of the optical amplifying medium 38 through the optical coupler 150 is input into an optical attenuator 156. The attenuation factor of the optical attenuator 156 is variable. The light output from the optical attenuator 156 is branched into first branch light and second branch light by an optical coupler 158. The first branch light from the optical coupler 158 is output to an optical transmission line (not shown). The second branch light from the optical coupler 158 is supplied to an optical band-pass filter 160 having a pass band including the wavelength of the signal light. Output light from the filter 160 is converted into an electrical signal by an O/E converter 162. An ALC circuit 164 controls the attenuation factor of the optical attenuator 156 so that the output level of the O/E converter 162 becomes constant.

Figure 13:
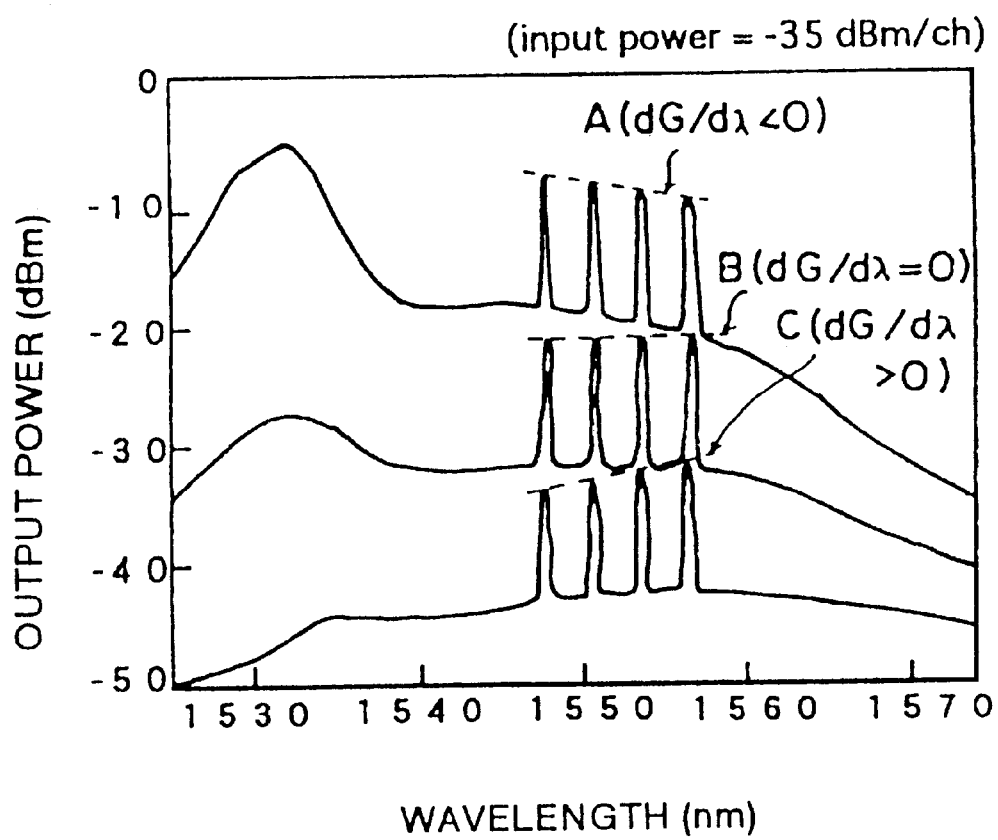
FIG. 13 is a graph for illustrating a gain tilt.

FIG. 13 is a graph for illustrating an example of the gain tilt in the optical amplifier shown in FIG. 12. There are shown in FIG. 13 the spectra of output beams when WDM signal beams each having four channels of wavelengths of 1548 nm, 1551 nm, 1554 nm, and 1557 nm are input with the same input power (−35 dBm/ch) into an EDF being pumped. In FIG. 13, the vertical axis represents output power (dBm) and the horizontal axis represents wavelength (nm). The spectrum shown by A corresponds to the case where the power of pump light is relatively large. In this case, a negative gain tilt occurs. That is, the differential of gain with respect to wavelength is negative (dG/dλ<0). The spectrum shown by C corresponds to the case where the power of pump light is relatively small. In this case, a positive gain tilt is obtained (dG/dλ>0). The spectrum shown by B corresponds to the case where the power of pump light is optimum such that no gain tilt occurs. In this case, the differential of gain with respect to wavelength is 0 (dG/dλ=0). Each spectrum shown in FIG. 13 has such a shape that four sharp spectra corresponding to the four channels of each WDM signal light are superimposed on a spectrum of ASE.

In the optical amplifier shown in FIG. 12, the ASE output from the first end 38A of the optical amplifying medium 38 is extracted, so that the spectrum of the WDM signal light is not superimposed on the spectrum of the ASE. Accordingly, the spectrum monitor 146 can monitor the ASE spectrum with a high accuracy without the influence of the power of the WDM signal light.

Such ASE propagating in the direction opposite to signal light will be hereinafter referred to as backward ASE.

Letting $P_{ASE}(\lambda)$ denote the power of backward ASE, it is given by Eq. (1), which is a function of wavelength $\lambda$.

$$P_{ASE}(\lambda_0) = 2n_{SP}(\lambda_0)h(C/\lambda_0)[G(\lambda_0)-1]\Delta\lambda \quad (1)$$

where $n_{SP}(\lambda_0)$ is the spontaneous emission factor, h is the Planck constant, C is the velocity of light in a vacuum, $\lambda_0$ is the center wavelength in a band to be monitored, and $\Delta\lambda$ is the bandwidth of the band to be monitored. Usually, the wavelength dependence of each parameter is substantially constant in the range of $\Delta\lambda$, so that $\lambda_0$ is used as a representative. The spontaneous emission factor $n_{SP}(\lambda_0)$ has wavelength dependence, and a method of improving a monitoring accuracy so as to cope with this wavelength dependence will be hereinafter described.

In Eq. (1), $G(\lambda_0)$ represents the gain to be given as a function of wavelength. In this manner, gain characteristics (wavelength dependence of gain) are reflected in the spectrum of backward ASE. Accordingly, gain characteristics can be evaluated by cutting out two or more narrow bands included in an amplification band, individually detecting the powers in these narrow bands, and obtaining a deviation between detected values. Specifically, the spectrum monitor 146 shown in FIG. 12 includes means for branching backward ASE into first branch light and second branch light, a first optical band-pass filter having a first narrow pass band included in an amplification band, for receiving the first branch light, a second optical band-pass filter having a second narrow pass band included in the amplification band but different from the first pass band, for receiving the second branch light, first and second photodetectors for respectively receiving lights passed through the first and second optical band-pass filters, and means for detecting a deviation between output levels of the first and second photodetectors. This configuration will now be described more specifically.

FIG. 14 is a block diagram showing a preferred embodiment of the spectrum monitor 146 shown in FIG. 12. The backward ASE generated from the optical amplifying medium 38 (see FIG. 12) is supplied through an optical isolator 166 to an optical coupler 168. If reflection from a backward ASE monitoring system is low, the optical isolator 166 is unnecessary. The optical coupler 168 branches the input backward ASE into first branch beam and second branch beam. A branching ratio between the first branch beam and the second branch beam is set to 1:1, for example. The first and second branch beams are respectively supplied to optical band-pass filters 170 and 172. In the case that the backward ASE has a spectrum similar to the ASE spectrum as shown in FIG. 13, the center wavelengths in the pass bands of the filters 170 and 172 are respectively set to 1541 nm and 1559 nm, for example. The beams passed through the filters 170 and 172 are respectively supplied to photodiodes 174 and 176. Since output signals from the photodiodes 174 and 176 are current signals, I/V converters (current/voltage converters) 178 and 180 respectively corresponding to the photodiodes 174 and 176 are used. Output voltage signals from the I/V converters 178 and 180 are respectively supplied to a minus input port and a plus input port of an operational amplifier 182. As a result, an output signal from the operational amplifier 182 reflects a deviation between the output levels of the photodiodes 174 and 176.

Accordingly, by feeding back the output signal from the operational amplifier 182 to the bias current for the laser diode 148 (see FIG. 12), the spectral characteristics of the backward ASE generated in the optical amplifying medium 38 can be maintained, so that the gain tilt can be maintained constant. By suitably setting a target value of the deviation in the feedback loop, the gain tilt can be made flat as shown by B in FIG. 13, for example.

Figure 15:
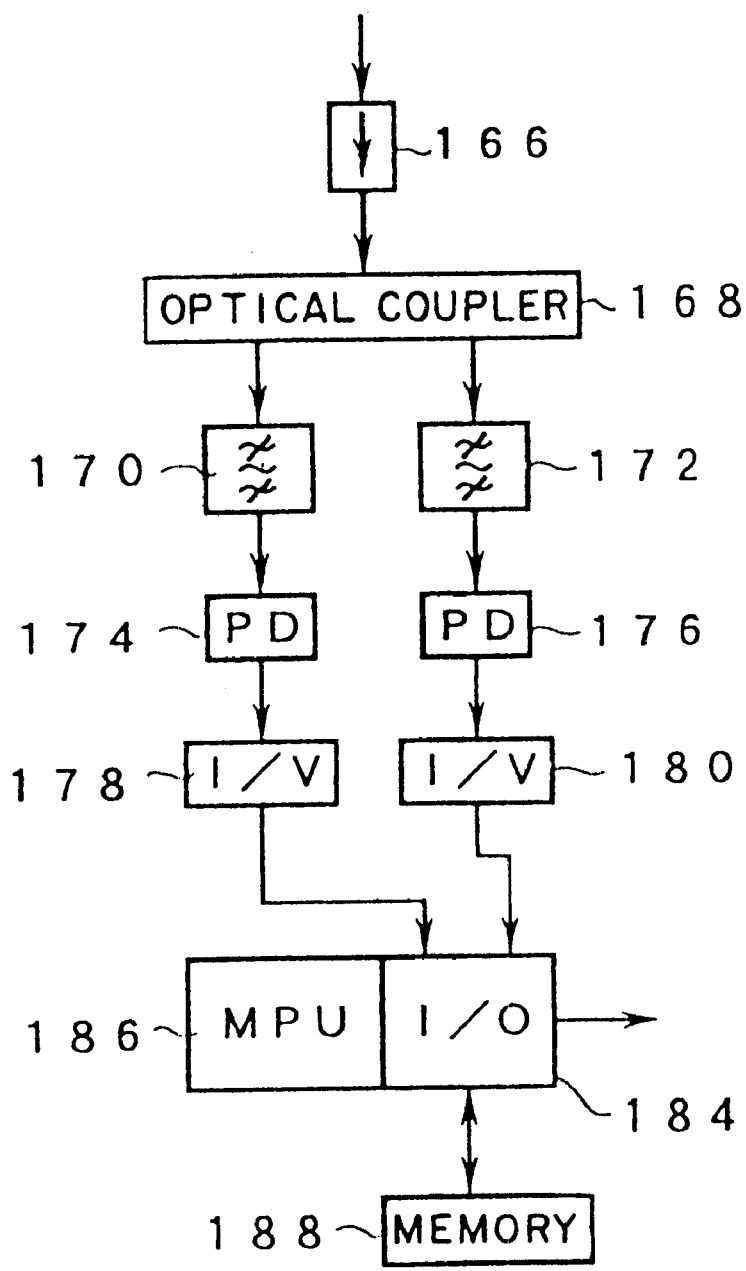
FIG. 15 is a block diagram of another spectrum monitor.

Referring to FIG. 15, there is shown another spectrum monitor applicable to the present invention. In this preferred embodiment, output signals from I/V converters 178 and 180 are taken through an I/O port 184 into an MPU (microprocessing unit) 186. The MPU 186 is connected through the I/O port 184 to a memory 188. The MPU 186 receives the output levels of the converters 178 and 180, calculates a deviation between the output levels, and outputs the calculated deviation through the I/O port 184.

As described above, the spontaneous emission factor $n_{SP}(\lambda_0)$ in Eq. (1) has wavelength dependence, that is, depends on the wavelength $\lambda_0$ to be monitored. Accordingly, in the case that higher monitoring accuracies are required, a data table of the spontaneous emission factor $n_{SP}(\lambda_0)$ using wavelength as a parameter may be previously stored in the memory 188 to obtain accurate spectral characteristics according to the data table. For example, the gain $G(\lambda)$ can be accurately calculated according to a calculated value of the deviation.

In the spectrum monitor shown in FIG. 14 or FIG. 15, the two narrow bands (first and second pass bands) are cut out from the amplification band. However, three or more optical band-pass filters may be used to cut out three or more narrow bands corresponding to the number of the optical band-pass filters from the amplification band. In this case, the accuracy of monitoring of the backward ASE to be calculated by the MPU 186 can be improved, for example.

Figure 15A:
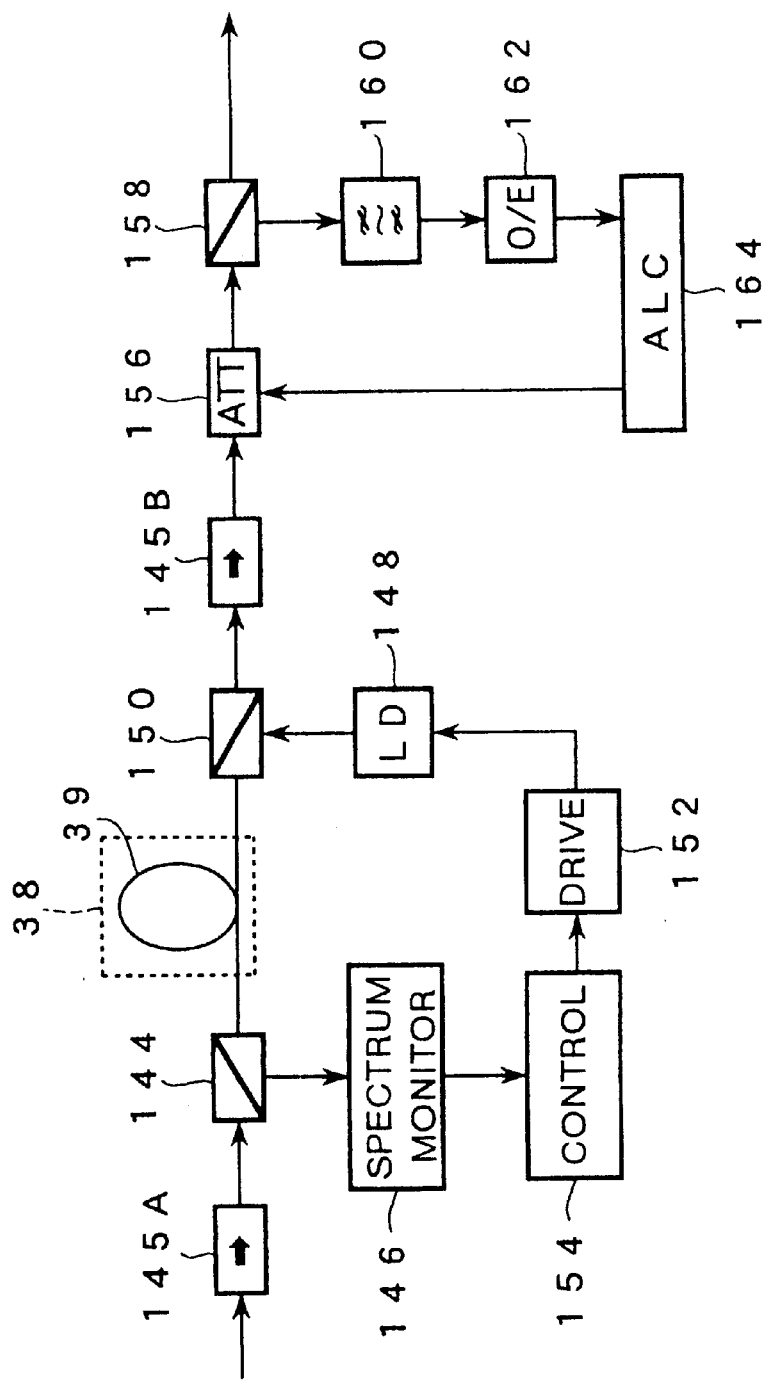
FIG. 15A is a block diagram showing a concrete example of the optical amplifier shown in FIG. 12.

FIG. 15A is a block diagram showing a concrete example of the optical amplifier shown in FIG. 12. In this example, an EDF(erbium doped fiber) 39 is used as the optical amplifying medium 38. In order to prevent a resonance in the EDF 39, an optical isolator 145A is provided on the input side of the optical coupler 144, and another optical isolator 145B is provided between the optical coupler 150 and the optical attenuator 156. The pump light from the laser diode 148 propagates in the direction opposite to the signal light in the EDF 39. That is, backward pumping is ad opted. Alternatively, forward pumping may be adopted such that the pumping light propagates in the same direction as the signal light. Further, pump light beams may be supplied into the EDF 39 from both ends thereof, thereby improving a pumping efficiency.

Figure 15B:
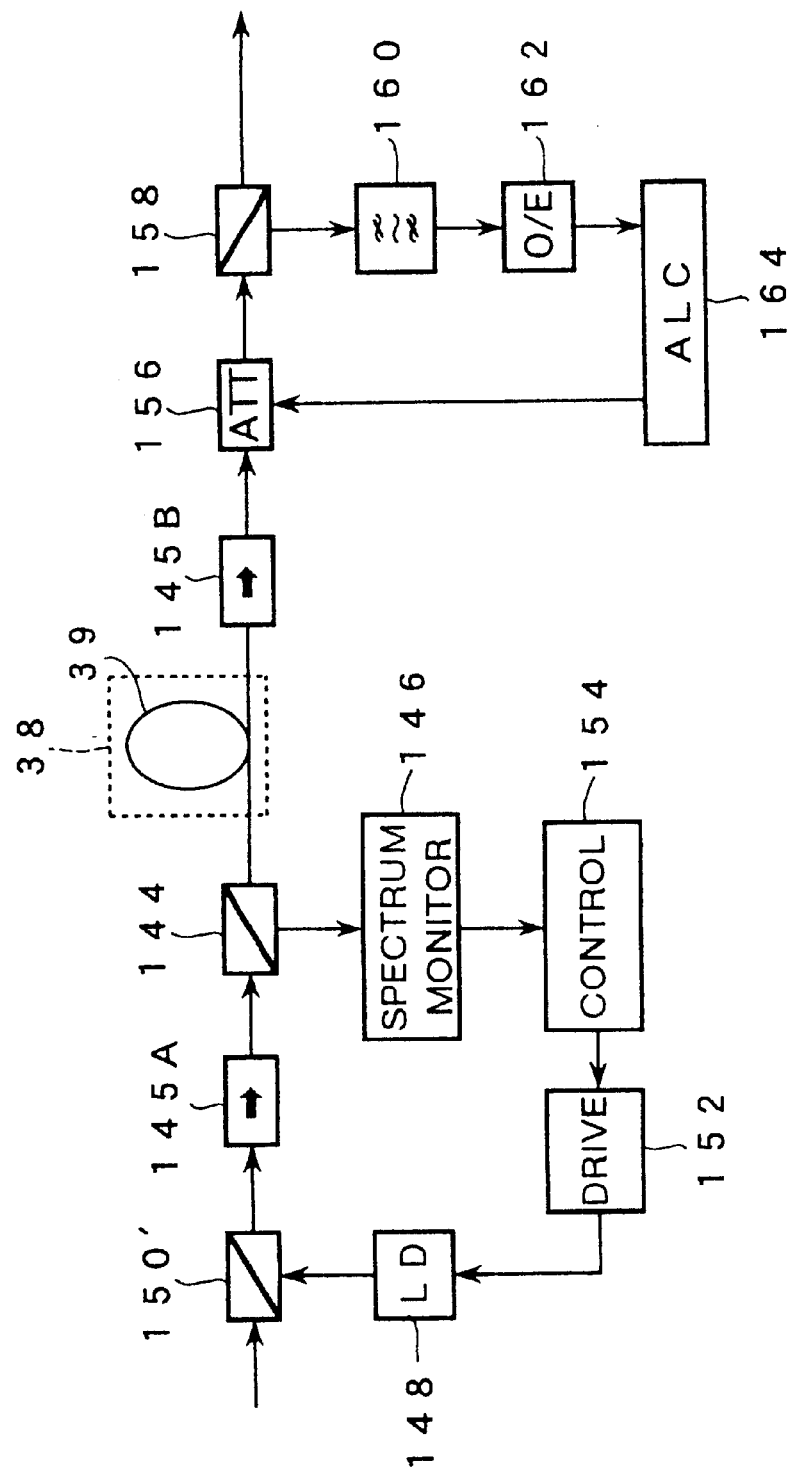
FIG. 15B is a block diagram showing another concrete example of the optical amplifier shown in FIG. 12.

FIG. 15B is a block diagram showing an optical amplifier to which the forward pumping is adopted. In place of the optical coupler 150(shown in FIG. 15A), an optical coupler 150' is provided on the input side of the optical isolator 145A. The pump light from the laser diode 148 and the signal light to be amplified are supplied to the EDF 39 through the optical coupler 150', the optical isolator 145A, and the optical coupler 144.

FIG. 16 is a block diagram showing a second preferred embodiment of the optical amplifier according to the present invention. In contrast with the optical amplifier shown in FIG. 12, the optical amplifier shown in FIG. 16 is characterized in that an optical attenuator 156' for ALC is provided upstream of the optical amplifying medium 38. That is, signal light to be input into the optical amplifying medium 38 from its first end 38A is preliminarily attenuated rather than attenuating amplified signal light. The attenuation factor of the optical attenuator 156' is controlled by an ALC circuit 164 so that an output level of an O/E converter 162 corresponding to an output level of this optical amplifier becomes constant.

According to the optical amplifier shown in FIG. 12 or FIG. 16, a constant gain tilt can be maintained, and ALC can also be performed.

Figure 17:
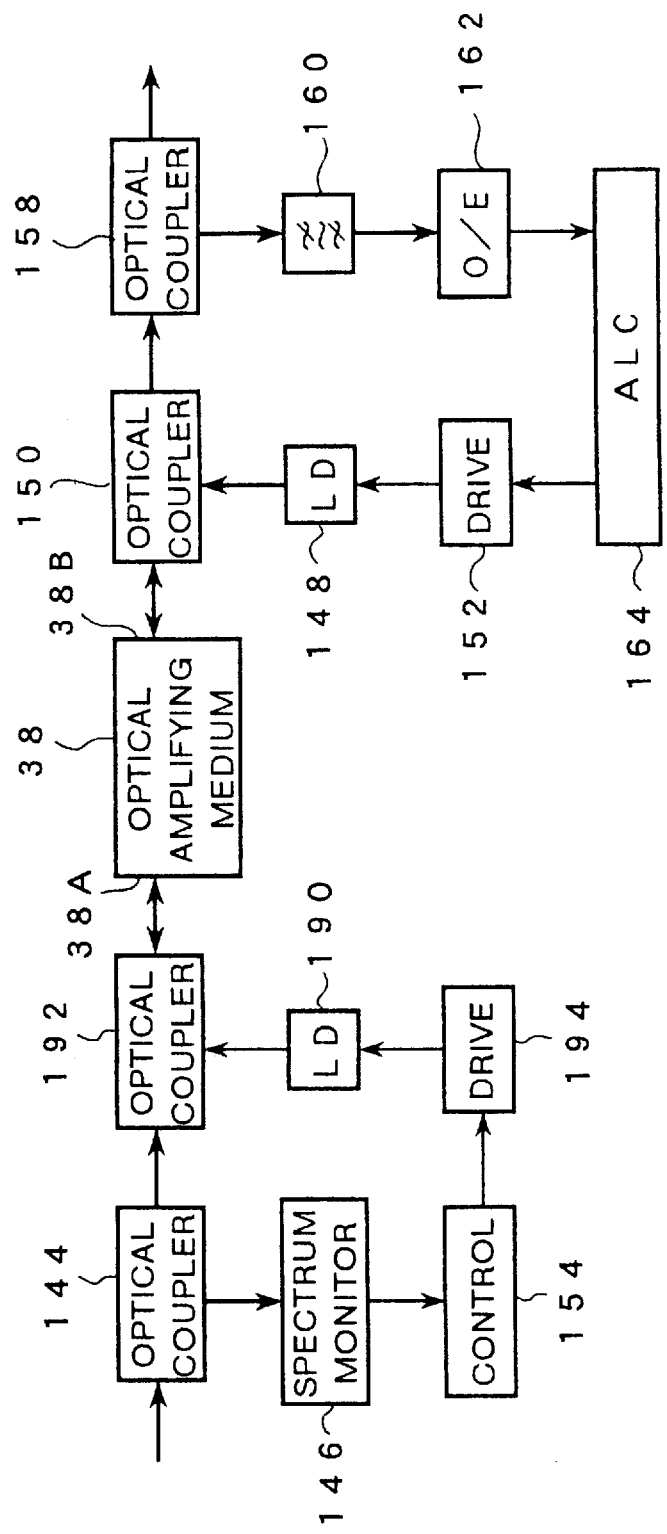
FIG. 17 is a block diagram showing a third preferred embodiment of the optical amplifier.

FIG. 17 is a block diagram showing a third preferred embodiment of the optical amplifier according to the present invention. This optical amplifier employs a compensation light source for supplying compensation light to the optical amplifying medium 38. The power of the compensation light is controlled so that the spectral characteristics of backward ASE are maintained. With this change, the power of pump light is subjected to ALC.

A laser diode 190 is used as the compensation light source. The compensation light from the laser diode 190 is supplied through an optical coupler 192 to the optical amplifying medium 38 from its first end 38A. Signal light to be amplified is supplied through an optical coupler 144 for extracting the backward ASE and the optical coupler 192 for the compensation light in this order to the optical amplifying medium 38 from its first end 38A. The backward ASE generated in the optical amplifying medium 38 is supplied through the optical coupler 192 and the optical coupler 144 in this order to a spectrum monitor 146. The laser diode 190 is supplied with a bias current from a drive circuit 194. The bias current to be supplied to the laser diode 190 is controlled by a control circuit 154. The control circuit 154 controls the bias current for the laser diode 190 so that the spectral characteristics of the backward ASE monitored by the spectrum monitor 146 are maintained. Accordingly, the power of the compensation light to be output from the laser diode 190 is controlled to maintain constant the gain characteristics of this optical amplifier.

In this preferred embodiment, the power of pump light is not used in the control for maintaining the gain characteristics constant. Accordingly, a pump light source can be included in the feedback loop for ALC. Since the compensation light is used for maintenance of the spectral characteristics, the compensation light is removed by an optical filter 160, and output light from the optical filter 160 is converted into an electrical signal by an O/E converter 162. A laser diode 148 as the pump light source is supplied with a bias current from a drive circuit 152. The bias current is controlled by an ALC circuit 164. Also according to the third preferred embodiment, a constant gain tilt can be maintained, and ALC can be performed. Further, an optical attenuator for ALC is unnecessary in the third preferred embodiment.

Figure 18:
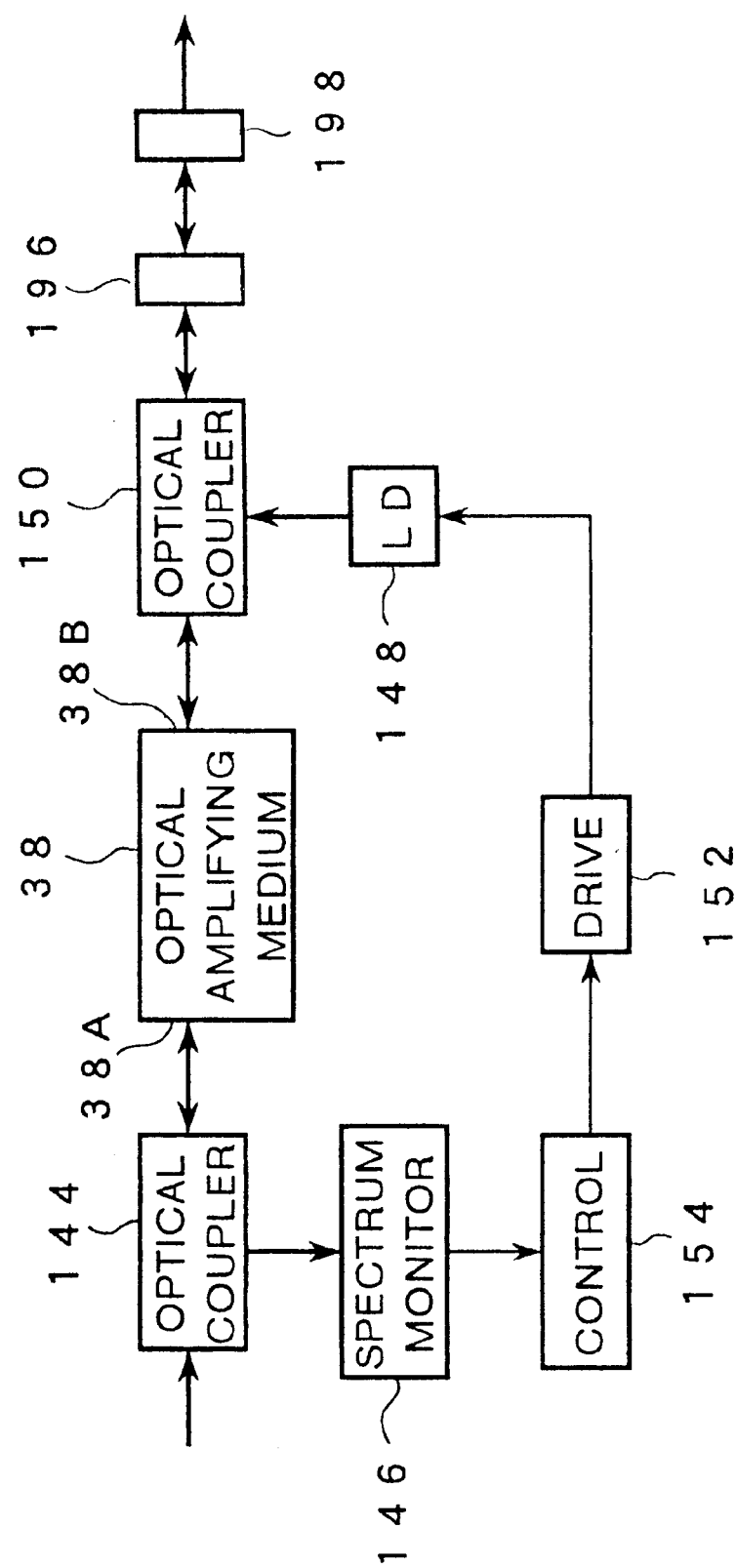
FIG. 18 is a block diagram showing a fourth preferred embodiment of the optical amplifier.

FIG. 18 is a block diagram showing a fourth preferred embodiment of the optical amplifier according to the present invention. In this preferred embodiment,. reflecting mirrors 196 and 198 are operatively connected to the second end 38B of the optical amplifying medium 38, so as to improve the accuracy of monitoring of the spectral characteristics of backward ASE in the spectrum monitor 146. In the case that the spectrum monitor 146 is configured as shown in FIG. 14, the reflecting mirror 196 reflects light having a wavelength included in the pass band of the optical band-pass filter 170 and transmits other light, and the reflecting mirror 198 reflects light having a wavelength included in the pass band of the optical band-pass filter 172 and transmits other light. By providing the reflecting mirrors 196 and 198, a part of the forward ASE output from the second end 38B of the optical amplifying medium 28 falling within a specific band can be reciprocated in the optical amplifying medium 38. Accordingly, the input powers into the photodiodes 174 and 176 shown in FIG. 14 can be increased to thereby improve or more narrow bands are cut out from the ASE spectrum, three or more reflecting mirrors corresponding to the number of the narrow bands are used.

In a doped fiber such as an EDF, SE (spontaneous emission) leaks sideways. The gain characteristics in the doped fiber are reflected in the SE. Further, the SE leaking sideways is not influenced by the number of channels of WDM signal light, input level, and accumulated ASE. This fact has been reported by Aida et al. in the International Conference, 1991 (Optical Amplifiers and their Applications; OAA, FE3), in which it has become apparent that gain $G(\lambda)$ can be obtained from an integral $P_{SE}(\lambda)$ of SE from a side surface of a doped fiber over the fiber length L in accordance with Eqs. (2) and (3).

$$P_{SE}(\lambda)=\{ln[G(\lambda)]+\alpha_S(\lambda)L\}/C(\lambda) \qquad (2)$$

$$C(\lambda)=\eta(\lambda) \{\sigma_e(\lambda)+\sigma_a(\lambda)\}\tau/\{h(C/\lambda)\pi(\gamma_{Er})^2\} \qquad (3)$$

where $\sigma_e(\lambda)$, $\sigma_a(\lambda)$ and $\alpha_S(\lambda)$ are the emission cross section at $\lambda$, the absorption cross section at $\lambda$, and the loss at $\lambda$, respectively, and $\tau$ and $\gamma_{Er}$ are the spontaneous emission lifetime and the radius of a region doped with Er, respectively. Further, $\eta(\lambda)$ is the coefficient having wavelength dependence. Accordingly, by monitoring the spectral characteristics of SE leaking sideways, gain characteristics (gain tilt) can be grasped.

Figure 19:
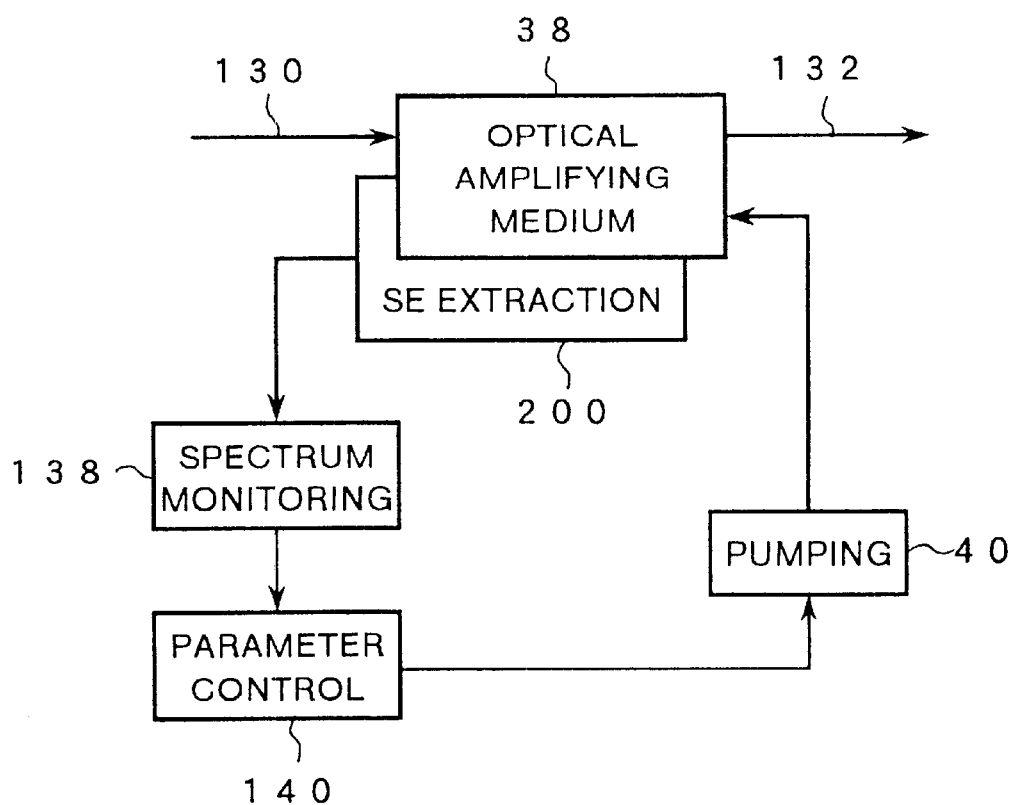
FIG. 19 is a block diagram showing a second basic configuration of the optical amplifier.

FIG. 19 is a block diagram showing a second basic configuration of the optical amplifier according to the present invention. An optical amplifying medium 38 has an optical waveguide structure to which signal light is supplied. Pumping means 40 pumps the optical amplifying medium 38 so that the optical amplifying medium 38 has an amplification band including the wavelength of the signal light. SE extracting means 200 extracts SE light leaking sideways from the optical waveguide structure of the optical amplifying medium 38. Monitoring means 138 monitors spectral characteristics giving the wavelength dependence of the power of the extracted SE. Parameter control means 140 controls a parameter on which the gain tilt in the amplification band of the optical amplifying medium 38 depends (or gain itself) so that the spectral characteristics monitored are maintained.

In the configuration shown in FIG. 19, the parameter to be controlled by the parameter control means 140 is the power of pump light in the pumping means 40. Alternatively, the parameter to be controlled by the parameter control means 140 may be the power of compensation light like in FIG. 10.

Figure 20:
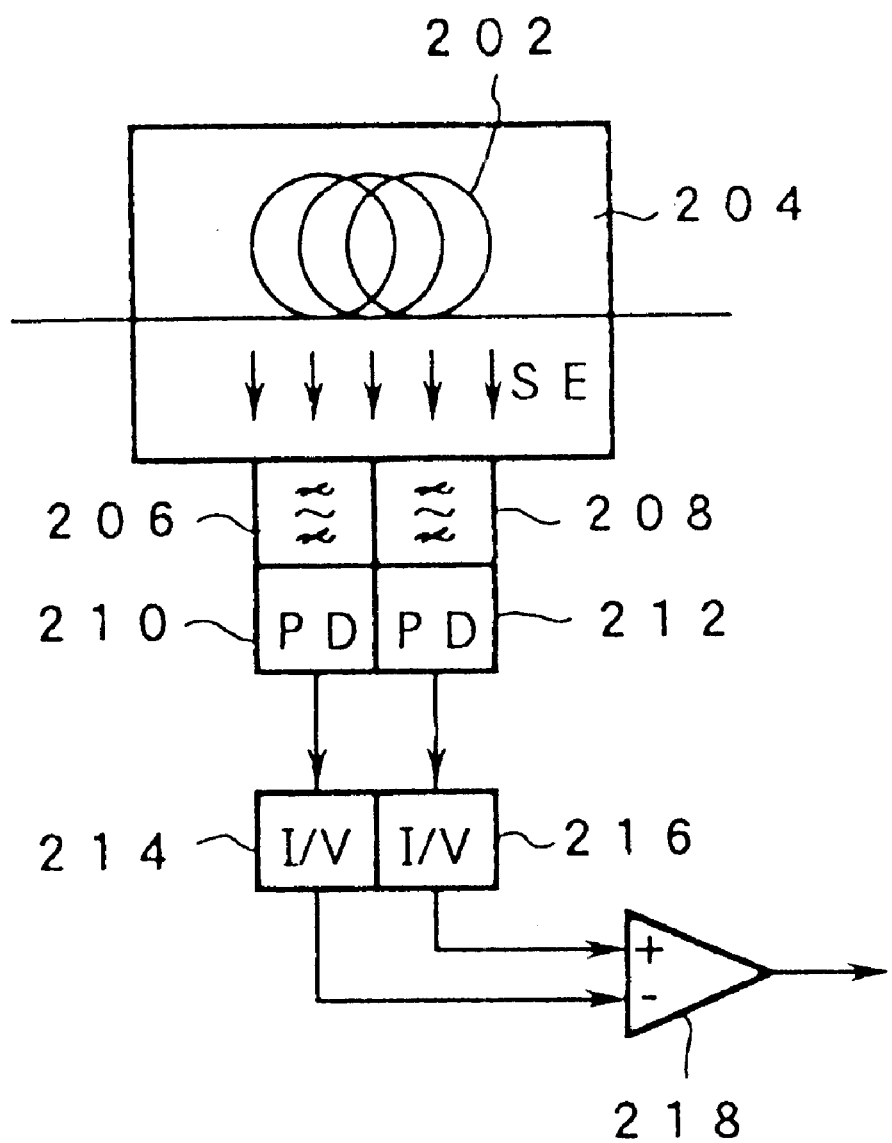
FIG. 20 is a block diagram of a spectrum monitor that can be used in the second basic configuration shown in FIG. 19.

FIG. 20 is a block diagram of a spectrum monitor that can be used as the SE extracting means 200 and the monitoring means 138 shown in FIG. 19. An EDF 202 is used as the optical amplifying medium 38 (see FIG. 19). Means for pumping the EDF 202 is not shown. The EDF 202 is accommodated in a case 204 such as an integrating sphere configured so as to block entering of external light. A cover of the EDF 202 is partially removed, and SE leaks sideways from an uncovered portion of the EDF 202. The SE is supplied to optical band-pass filters 206 and 208. The filters 206 and 208 have their pass bands similar to the pass bands of the optical band-pass filters 170 and 172 shown in FIG. 15, respectively.

The beams passed through the filters 206 and 208 are converted into current signals by photodiodes 210 and 212, respectively. The current signals from the photodiodes 210 and 212 are next converted into voltage. signals by I/V converters 214 and 216, respectively. The voltage signals from the I/V converters 214 and 216 are supplied to an operational amplifier 218. As described above, the gain characteristics of the optical amplifier are reflected on the SE spectrum. Accordingly, by controlling the power of pump light according to the SE spectral characteristics monitored, the gain tilt of the optical amplifier can be maintained constant.

The spectrum monitor shown in FIG. 20 may be modified according to the configuration shown in FIG. 15. That is, an MPU is used for monitoring of the spectral characteristics. In this case, by previously storing $C(\lambda)$, $\alpha_s$, and L in Eqs. (2) and (3) in a memory, the monitoring accuracy of the spectral characteristics can be improved. Further, three or more narrow bands may be cut out from the SE spectrum, and optical power in each band may be detected to perform various controls according to the result of detection.

Figure 21:
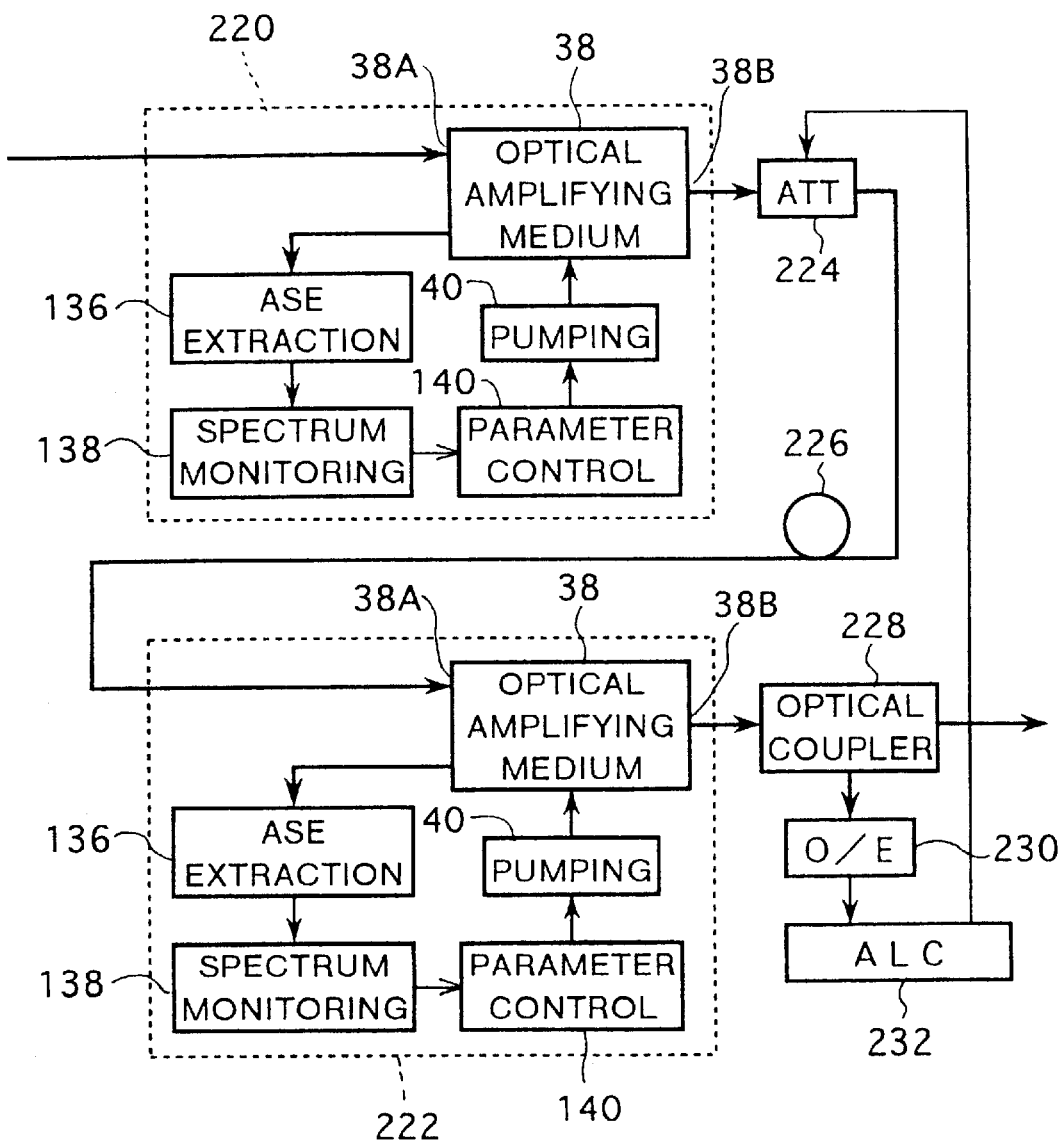
FIG. 21 is a block diagram showing a third basic configuration of the optical amplifier.

FIG. 21 is a block diagram showing a third basic configuration of the optical amplifier according to the present invention. This optical amplifier is configured by cascading a first optical amplifier unit 220 and a second optical amplifier unit 222. Each of the optical amplifier units 220 and 222 has the first basic configuration shown in FIG. 10. Light amplified in the first optical amplifier unit 220 is attenuated by an optical attenuator 224 having a variable attenuation factor, and next transmitted through a dispersion compensating fiber (DCF) 226 to the second optical amplifier unit 222. The DCF 226 has a dispersion value so as to cancel chromatic dispersion influenced the signal light in a transmission line. The light output from the second optical amplifier unit 222 is branched into first branch light and second branch light by an optical coupler 228. The first branch light from the optical coupler 228 is output to an optical transmission line (not shown). The second branch light from the optical coupler 228 is converted into an electrical signal by an O/E converter 230. An ALC circuit 232 controls the attenuation factor of the optical attenuator 224 so that,the output level of the O/E converter 230 is maintained constant.

Such a two-stage configuration of the optical amplifier in this preferred embodiment is due to the following reasons. The first reason is that a loss in a DCF is large in general, and it is therefore necessary to raise the level of the signal light to some extent on the upstream side of the DCF 226. The second reason is that if an optical amplifier gain on the upstream side of the DCF 226 is made excess to increase the power of the signal light, nonlinear effects are prone to occur in the DCF 226. If four-wave mixing (FWM) as one of the nonlinear effects occurs in the DCF 226 in a system employing WDM, interchannel crosstalk is increased. Further, self-phase modulation (SPM) also invites a deterioration in signal quality.

According to the third basic configuration, a constant gain tilt can be maintained, and ALC can also performed.

As described above, according to an aspect of the present invention, it is possible to provide an optical communication system which can easily respond to a change in the number of WDM channels. According to another aspect of the present invention, it is possible to provide an optical amplifier which can maintain a constant gain tilt. According to a further aspect of the present invention, it is possible to provide an optical amplifier which can maintain a constant gain tilt and allows automatic level control.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical amplifier comprising:
   an optical amplifying medium amplifying a wavelength division multiplexed (WDM) light including a plurality of optical signals multiplexed together, the optical amplifying medium comprising
   a first optical amplifier amplifying the WDM light, a variable optical attenuator attenuating the WDM light amplified by the first optical amplifier, a dispersion compensation fiber compensating a dispersion of the WDM light attenuated by the variable optical attenuator, and a second optical amplifier amplifying the WDM light dispersion compensated by the dispersion compensation fiber;

a first detector detecting a supervisor signal in WDM light;

a second detector detecting an input light power to the optical amplifying medium;

a third detector detecting an output power of the optical amplifying medium; and a controller controlling a gain of the optical amplifying medium in accordance with the supervisor signal detected by the first detector, the input light power detected by the second detector and the output power detected by the third detector.

2. An optical amplifier comprising:

an optical amplifying medium amplifying a wavelength division multiplexed (WDM) light, the optical amplifying medium comprising a first optical amplifier amplifying the WDM light, a variable optical attenuator attenuating the WDM light amplified by the first optical amplifier, a dispersion compensation fiber compensating a dispersion of the WDM light attenuated by the variable optical attenuator, and a second optical amplifier amplifying the WDM light dispersion compensated by the dispersion compensation fiber; and a controller controlling a gain of the optical amplifying medium in accordance with a supervisory signal in the WDM light detected by the optical amplifier, a power of the WDM light input to the optical amplifying medium as detected by the optical amplifier, and an output power of the amplified WDM light from the optical amplifying medium as detected by the optical amplifier.

3. An optical amplifier comprising:

an optical amplifying medium amplifying a wavelength division multiplexed (WDM) light, the optical amplifying medium comprising a first optical amplifier amplifying the WDM light, a variable optical attenuator attenuating the WDM light amplified by the first optical amplifier, a dispersion compensation fiber compensating a dispersion of the WDM light attenuated by the variable optical attenuator, and a second optical amplifier amplifying the WDM light dispersion compensated by the dispersion compensation fiber; and means for controlling a gain of the optical amplifying medium in accordance with a supervisory signal in the WDM light detected by the optical amplifier, a power of the WDM light input to the optical amplifying medium as detected by the optical amplifier, and an output power of the amplified WDM light from the optical amplifying medium as detected by the optical amplifier.

* * * * *